United States Patent
Slutsky

(10) Patent No.: US 12,443,795 B1
(45) Date of Patent: Oct. 14, 2025

(54) PATENT PROOFREADING AND ANALYTICS

(71) Applicant: CLAIMABLY LLC, Bloomfield Township, MI (US)

(72) Inventor: Isaac T. Slutsky, Bloomfield Township, MI (US)

(73) Assignee: CLAIMABLY LLC, Bloomfield Township, MI (US)

(*) Notice: Subject to any disclaimer, the term of this patent is extended or adjusted under 35 U.S.C. 154(b) by 83 days.

(21) Appl. No.: 17/695,301

(22) Filed: Mar. 15, 2022

Related U.S. Application Data

(60) Provisional application No. 63/161,622, filed on Mar. 16, 2021.

(51) Int. Cl.
*G06F 40/166* (2020.01)
*G06F 40/232* (2020.01)
*G06F 40/253* (2020.01)
*G06F 40/30* (2020.01)
*G06Q 50/18* (2012.01)

(52) U.S. Cl.
CPC ......... *G06F 40/232* (2020.01); *G06F 40/166* (2020.01); *G06F 40/253* (2020.01); *G06F 40/30* (2020.01); *G06Q 50/184* (2013.01)

(58) Field of Classification Search
CPC ... G06Q 50/184; G06F 40/166; G06F 40/253; G06F 40/284
See application file for complete search history.

(56) References Cited

U.S. PATENT DOCUMENTS

| | | | | |
|---|---|---|---|---|
| 5,774,833 | A * | 6/1998 | Newman | G06F 40/211 704/9 |
| 7,225,399 | B2 * | 5/2007 | Watson | G06F 40/151 715/210 |
| 8,312,067 | B2 * | 11/2012 | Elias | G06F 40/169 707/931 |
| 8,364,470 | B2 * | 1/2013 | Abraham | G06F 40/279 704/10 |

(Continued)

FOREIGN PATENT DOCUMENTS

WO    WO-9325974 A1 * 12/1993 ........... G06F 17/274

OTHER PUBLICATIONS

Riedl, Christoph et al. "Detecting figures and part labels in patents: competition-based development of graphics recognition algorithms." International Journal on Document Analysis and Recognition (IJDAR) 19 (2014): 155-172. (Year: 2014).*

(Continued)

*Primary Examiner* — Benjamin Smith
(74) *Attorney, Agent, or Firm* — BROOKS KUSHMAN P.C.

(57) ABSTRACT

In a document, acronym data is captured including acronym definitions and acronym uses. In the document, element data is captured including element numerals and element names corresponding to the element numerals. The element names in the element data are normalized based at least in part on the acronym definitions. Canonical names for each of the element numerals are determined. The element data for which the normalized element names fail to match the canonical names for corresponding element numerals of the element data is flagged. The document and the flagged element data are displayed in a user interface.

21 Claims, 27 Drawing Sheets

(56) References Cited

U.S. PATENT DOCUMENTS

| | | | | |
|---|---|---|---|---|
| 8,589,370 B2* | 11/2013 | Feng | G06F 40/284 | 707/705 |
| 8,739,032 B2* | 5/2014 | Walsh | G06F 16/93 | 707/723 |
| 9,311,286 B2* | 4/2016 | Bank | G06F 40/151 | |
| 9,372,923 B2* | 6/2016 | Elias | G06F 16/345 | |
| 9,430,720 B1* | 8/2016 | Tsibulevskiy | G06F 16/24553 | |
| 9,454,523 B2* | 9/2016 | Endo | G06F 40/274 | |
| 9,508,027 B2* | 11/2016 | Tsibulevskiy | G06V 30/414 | |
| 9,558,402 B2* | 1/2017 | Tsibulevskiy | G06T 11/001 | |
| 9,785,631 B2* | 10/2017 | Vassilieva | G06F 40/295 | |
| 9,805,429 B2* | 10/2017 | Elias | H04W 4/02 | |
| 9,836,460 B2* | 12/2017 | Elias | G06F 16/358 | |
| 9,953,013 B2* | 4/2018 | Tsibulevskiy | G06T 11/001 | |
| 9,959,582 B2* | 5/2018 | Sukman | G06F 40/169 | |
| 10,115,170 B2* | 10/2018 | Elias | G06F 16/93 | |
| 10,216,993 B2* | 2/2019 | Jong | G06V 30/413 | |
| 10,311,134 B2* | 6/2019 | Tsibulevskiy | G06F 16/24553 | |
| 10,325,011 B2* | 6/2019 | Tsibulevskiy | G06T 11/001 | |
| 10,366,461 B2* | 7/2019 | Edmund | G06F 40/263 | |
| 10,409,900 B2* | 9/2019 | Afram | G06F 40/166 | |
| 10,540,443 B2* | 1/2020 | Aragon Y Willems | G06F 16/93 | |
| 10,657,368 B1* | 5/2020 | Edmund | G06V 30/418 | |
| 10,698,937 B2* | 6/2020 | Curzi | G06F 9/5038 | |
| 10,719,898 B2* | 7/2020 | Elias | G06Q 10/10 | |
| 10,755,045 B2* | 8/2020 | Crouse | G06Q 50/184 | |
| 10,891,700 B2* | 1/2021 | Elias | G06F 16/156 | |
| 10,929,455 B2* | 2/2021 | Jetley | G06F 11/302 | |
| 10,997,678 B2* | 5/2021 | Elias | G06F 16/245 | |
| 11,061,956 B2* | 7/2021 | Von Haden | G06F 40/30 | |
| 11,126,648 B2* | 9/2021 | Von Haden | G06F 40/242 | |
| 11,194,956 B2* | 12/2021 | O'Neill | G06F 40/137 | |
| 11,232,137 B2* | 1/2022 | Elias | G06F 16/3322 | |
| 11,232,251 B2* | 1/2022 | Tsibulevskiy | G06F 16/24553 | |
| 11,263,714 B1* | 3/2022 | Edmund | G06F 40/284 | |
| 11,341,323 B1* | 5/2022 | Donahue, III | G06Q 50/184 | |
| 11,393,237 B1* | 7/2022 | Edmund | G06V 30/418 | |
| 11,435,887 B1* | 9/2022 | Mirho | G06Q 50/184 | |
| 11,475,209 B2* | 10/2022 | Gelosi | G06F 16/31 | |
| 11,676,231 B1* | 6/2023 | Crouse | G06F 16/906 | 707/723 |
| 11,734,782 B2* | 8/2023 | Edmund | G06F 40/284 | 705/310 |
| 11,768,995 B2* | 9/2023 | O'Neill | G06F 40/106 | 704/9 |
| 11,989,512 B2* | 5/2024 | Yoo | G06F 40/166 | |
| 2002/0107896 A1* | 8/2002 | Ronai | G06F 40/10 | 715/261 |
| 2004/0059566 A1* | 3/2004 | Fogel | G06F 40/226 | 715/224 |
| 2004/0059567 A1* | 3/2004 | Fogel | G06F 40/30 | 715/224 |
| 2004/0059994 A1* | 3/2004 | Fogel | G06F 40/30 | 715/256 |
| 2004/0098673 A1* | 5/2004 | Riddoch | G06F 40/169 | 715/266 |
| 2005/0216828 A1* | 9/2005 | Brindisi | G06F 40/169 | 715/201 |
| 2008/0216013 A1* | 9/2008 | Lundberg | G06Q 50/18 | 715/764 |
| 2008/0281860 A1* | 11/2008 | Elias | G06F 16/345 | 707/999.102 |
| 2009/0157679 A1* | 6/2009 | Elias | G06F 40/279 | |
| 2009/0182554 A1* | 7/2009 | Abraham | G06F 40/279 | 704/9 |
| 2009/0228777 A1* | 9/2009 | Henry | G06F 16/40 | 707/999.005 |
| 2009/0276694 A1* | 11/2009 | Henry | G06F 16/313 | 715/823 |
| 2011/0307499 A1* | 12/2011 | Elias | G06F 16/34 | 707/750 |
| 2013/0191739 A1* | 7/2013 | Bank | G06F 40/157 | 715/259 |
| 2013/0238987 A1* | 9/2013 | Lutwyche | G06F 40/197 | 715/256 |
| 2014/0317001 A1* | 10/2014 | Elias | G06Q 10/10 | 705/310 |
| 2014/0317096 A1* | 10/2014 | Elias | G06F 16/31 | 707/722 |
| 2014/0317097 A1* | 10/2014 | Elias | G06F 7/00 | 707/722 |
| 2015/0066480 A1* | 3/2015 | Endo | G06F 40/274 | 704/9 |
| 2015/0187033 A1* | 7/2015 | Sukman | G06F 40/169 | 705/310 |
| 2015/0227590 A1* | 8/2015 | Nissen | G06F 16/94 | 707/728 |
| 2016/0267613 A1* | 9/2016 | Elias | G06F 16/382 | |
| 2017/0097747 A1* | 4/2017 | Allen | G06Q 10/10 | |
| 2017/0199963 A1* | 7/2017 | Kondadadi | G16H 15/00 | |
| 2018/0060983 A1* | 3/2018 | Elias | G06F 16/382 | |
| 2018/0173811 A1* | 6/2018 | Aragon Y Willems | G06F 16/93 | |
| 2018/0253416 A1* | 9/2018 | Crouse | G06Q 50/184 | |
| 2018/0253810 A1* | 9/2018 | Edmund | G06F 40/263 | |
| 2018/0300323 A1* | 10/2018 | Lee | G06F 16/353 | |
| 2019/0012753 A1* | 1/2019 | Elias | G06F 7/00 | |
| 2019/0057074 A1* | 2/2019 | Carey | G06F 16/3344 | |
| 2019/0179653 A1* | 6/2019 | Von Haden | G06F 3/0483 | |
| 2019/0179680 A1* | 6/2019 | Von Haden | G06F 3/04842 | |
| 2019/0179839 A1* | 6/2019 | Elias | G06F 16/3322 | |
| 2019/0179898 A1* | 6/2019 | Jetley | G06F 9/453 | |
| 2019/0179958 A1* | 6/2019 | Curzi | G06F 16/31 | |
| 2019/0332664 A1* | 10/2019 | O'Neill | G06F 40/143 | |
| 2020/0342553 A1* | 10/2020 | Elias | G06F 16/248 | |
| 2021/0012444 A1* | 1/2021 | Carey | G06F 40/14 | |
| 2021/0157975 A1* | 5/2021 | Gelosi | G06F 40/166 | |
| 2022/0114338 A1* | 4/2022 | Yoo | G06Q 10/10 | |
| 2022/0156450 A1* | 5/2022 | O'Neill | G06F 40/137 | |
| 2022/0180051 A1* | 6/2022 | Lillemo | G06F 40/253 | |
| 2022/0215171 A1* | 7/2022 | Yoo | G06F 40/274 | |
| 2022/0215172 A1* | 7/2022 | Yoo | G06F 40/166 | |
| 2022/0319219 A1* | 10/2022 | Tsibulevskiy | G06T 3/60 | |
| 2022/0343445 A1* | 10/2022 | Edmund | G06F 40/137 | |
| 2022/0357839 A1* | 11/2022 | Mirho | G06F 3/0486 | |
| 2023/0063363 A1* | 3/2023 | Zuniga | G06F 40/166 | |
| 2023/0252224 A1* | 8/2023 | Tran | G06F 40/56 | 715/256 |
| 2023/0334845 A1* | 10/2023 | Zuniga | G06V 30/422 | |
| 2024/0265203 A1* | 8/2024 | Yoo | G06F 40/47 | |

OTHER PUBLICATIONS

Zhu, Siyu and Richard Zanibbi. "Label Detection and Recognition for USPTO Images Using Convolutional K-Means Feature Quantization and Ada-Boost." 2013 12th International Conference on Document Analysis and Recognition (2013): 633-637. (Year: 2013).*

Rusiñol, Marçal, Lluís-Pere de las Heras and Oriol Ramos Terrades. "Flowchart recognition for non-textual information retrieval in patent search." Information Retrieval 17 (2014): 545-562. (Year: 2014).*

Ming Gong, "Recognizing Figure Labels in Patents", 2021, 4 pages, https://ceur-ws.org/Vol-2831/paper11.pdf (Year: 2021).*

Patent Bots, Prep & Pros Pro Proofreading, "hardware application" 2023, 36 pages, https://gcp.patentbots.com/hardware-example (Year: 2023).*

Patent Bots, Prep & Pros Pro Proofreading, "business method application" 2023, 44 pages, https://gcp.patentbots.com/business-method-example (Year: 2023).*

LexisNexis "PatentOptimizer Quick Reference Guide" Dec. 2007, 8 pages, https://www.lexisnexis.com/literature/pdfs/patentoptimizer_quickreference.pdf (Year: 2007).*

(56) References Cited

OTHER PUBLICATIONS

ClaimMaster, "Example Patent Document Report", Mar. 27, 2017, 42 pages, https://www.patentclaimmaster.com/docs/demo_report.pdf (Year: 2017).*

* cited by examiner

[0003] A swivel chair 100 includes a base 102 and legs 104 extending radially outward from a center of the base 102. Coasters 106 may attach to the lower portion of each of the legs 102 to allow the swivel chair 100 to roll. A telescopic support 108 extends vertically upwards from the middle of the base 102. A chair frame (CF) 110 is attached to the top of the telescopic support 108. The CF 110, in turn, includes a seat 112, a pair of arm rests 114, and a chair back 116. In some examples, the CF 112 may be made of metal.

[0004] A chain file (CF) may use a DSF map ...

FIG. 4

[0003] A swivel chair 100 includes a base 102 and legs 104 extending radially outward from a center of the base 102. Coasters 106 may attach to the lower portion of each of the legs 102 to allow the swivel chair 100 to roll. A telescopic support 108 extends vertically upwards from the middle of the base 102. A CF 110 is attached to the top of the telescopic support 108. The chair frame (CF) 110, in turn, includes a seat 112, a pair of arm rests 114, and a chair back 116. In some examples, the CF 112 may be made of metal.

[0004] A chain file (CF) may use a DSF map ...

FIG. 5

[0003] A swivel chair 100 includes a base 102 and legs 104 extending radially outward from a center of the base 102. Coasters 106 may attach to the lower portion of each of the legs 104 to allow the swivel chair 100 to roll. A telescopic support 108 extends vertically upwards from the middle of the base 102. A chair frame (CF) 110 is attached to the top of the telescopic support 108. The CF 110, in turn, includes a seat 112, a pair of arm rests 114, and a chair back 116. In some examples, the CF 110 may be made of metal.

[0004] A chain file may use a map ...

FIG. 13

[0003] A swivel chair 100 includes a base 102 and legs 104 extending radially outward from a center of the base 102. Coasters 106 may attach to the lower portion of each of the legs 104 to allow the swivel chair 100 to roll. A telescopic support 108 extends vertically upwards from the middle of the base 102. A chair frame (CF) 110 is attached to the top of the telescopic support 108. The CF 110, in turn, includes a seat 112, a pair of arm rests 114, and a chair back 116. In some examples, the CF 110 may be made of metal. The c|

[0004] A chain file may use a map ...

swivel chair 100
coasters 106
CF 110

FIG. 14

CLAIMS:

1. A swivel chair comprising:
   a base;
   legs extending radially outward from a center of the base; coasters attached to the lower portion of each of the legs to allow the swivel chair to roll;
   a telescopic support extending vertically upwards from the middle of the base; and
   a chair frame (CF) attached to the top of the telescopic support, the CF including a seat, a pair of arm rests, and a chair back.

2. The chair of claim 1, wherein the CF is metal.

FIG. 16

CLAIMS:

1. A swivel chair comprising:
    a base;
    legs extending radially outward from from a center of the base; coasters attached to the lower portion of each of the legs to allow the swivel chair to roll;
    a telescopic support extending vertically upwards from the middle of the base; and
    a chair frame (CF) attached to the top of the telescopic support, the CF including a seat, a pair of arm rests, and a chair back.

2. The chair of claim 1, wherein the CF is metal.

FIG. 17

CLAIMS:

1. A swivel chair comprising:
   a base;
   legs extending radially outward from a center of the base;
   coasters attached to the lower portion of each of the legs to allow the swivel chair to roll;
   a telescopic support extending vertically upwards from the middle of the base; and
   a chair frame (CF) attached to the top of the telescopic support, the CF including a seat, a pair of arm rests, and a chair back.

2. The chair of claim 1, wherein the CF is metal.

FIG. 18

```
v Claim 1
    Introduction - A swivel chair
    Introduction - a base
    Introduction - legs
    Introduction - a center
    Has Antecedent - the base
    Introduction - coasters
    Inherent Antecedent - the lower portion
    ...
> Claim 2
```

CLAIMS:

1. A swivel chair comprising:
   <u>a first leg and a second leg, the legs being attached to a base</u>;
   coasters attached to the lower portion of each leg to allow the swivel chair to roll;
   ...

2. A method for building a chair comprising:
   <u>attaching legs to a base</u>;
   <u>adding, to each attached leg</u>, a coaster to allow the chair to roll;
   ...

FIG. 20

CLAIMS:

1. A swivel chair comprising:

the base;     1002A legs extending radially outward from a center of the base;     1002B coasters attached to the lower portion of each of the legs to allow the swivel chair to roll;

a telescopic support extending vertically upwards from the middle of the base; and     1002C a CF attached to the top of the telescopic support, the chair frame (CF) including a seat, a pair of arm rests, and a chair back.     1002D 3. The chair of claim 1, wherein the CF is metal.     1002E

FIG. 21

CLAIMS:

1. A swivel chair comprising:

a base;

legs extending radially outward from a center of the base;

coasters attached to the lower portion of each of the legs to allow the swivel chair to roll;

a telescopic support extending vertically upwards from the middle of the base; and a CF attached to the top of the telescopic support, the chair fr̶a̶[Undefined Acronym >]t, a pair of arm rests, and a chair ba | Cut 2. The | Copy
   | Paste

Suggestions:
   chair frame (CF)
   chain file (CF)
   Show in Sidebar

FIG. 23

CLAIMS:

1. A swivel chair comprising:
   a base;
   legs extending radially outward from a center of the base;
   coasters attached to the lower portion of each of the legs to allow the swivel chair to roll;
   a telescopic support extending vertically upwards from the middle of the base; and
   a CF attached to the top of the telescopic support, the chair frame (CF) including a seat, a pair of arm rests, and a chair back.

2. The chair of claim 1, wherein the c|

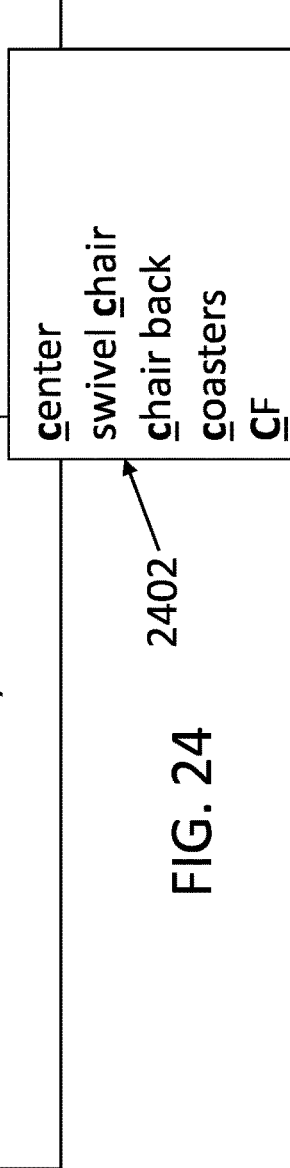

CLAIMS:

1. A swivel chair comprising:
   a base;
   legs extending radially outward from a center of the base; coasters attached to the lower portion of each of the legs to allow the swivel chair to roll;
   a telescopic support extending vertically upwards from the middle of the base; and
   a CF attached to the top of the telescopic support, the chair frame (CF) including a seat, a pair of arm rests, and a chair back.

2. The chair of claim 1, wherein a s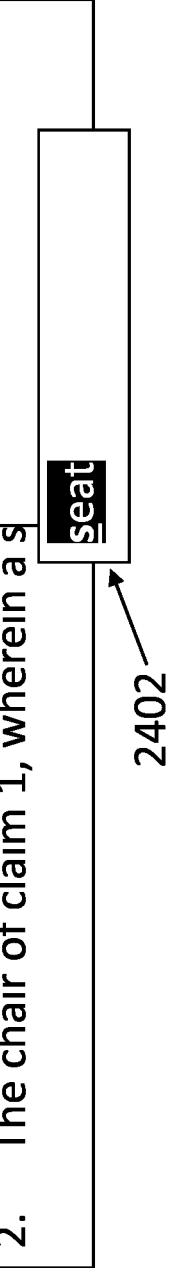

PATENT PROOFREADING AND ANALYTICS

CROSS-REFERENCE TO RELATED APPLICATIONS

This application claims the benefit of U.S. provisional application Ser. No. 63/161,622 filed Mar. 16, 2021, the disclosure of which is hereby incorporated in its entirety by reference herein.

TECHNICAL FIELD

Aspects of the disclosure relate to automated patent proofreading, as well as to use of such analysis in providing writing aids for the drafting of patent applications.

SUMMARY

In one or more illustrative examples, a system for document analysis is provided. The system includes a memory configured to store a document and an application. The system further includes a processor programmed to execute the application on the document to capture, in the document, acronym data including acronym definitions and acronym uses, capture, in the document, element data including element numerals and element names corresponding to the element numerals, normalize the element names in the element data based at least in part on the acronym definitions, determine canonical names for each of the element numerals, flag the element data for which the normalized element names fail to match the canonical names for corresponding element numerals of the element data, and display the document and the flagged element data in a user interface.

In one or more illustrative examples, a system for document analysis is provided. The system includes a memory configured to store a document and an application. The system further includes a processor programmed to execute the application on the document to capture, in the document, acronym data including acronym definitions and acronym uses, capture, in the document, claim data including claim elements recited in one or more claims, normalize the claim elements in the claim data based at least in part on the acronym definitions, identify antecedent basis issues for the claim elements, flag the claim data for which the claim elements fail to find antecedent basis in the claim elements, and display the document and the flagged claim data in a user interface.

In one or more illustrative examples, a method for document analysis is provided. In a document, acronym data is captured including acronym definitions and acronym uses. In the document, element data is captured including element numerals and element names corresponding to the element numerals. The element names in the element data are normalized based at least in part on the acronym definitions. Canonical names for each of the element numerals are determined. The element data for which the normalized element names fail to match the canonical names for corresponding element numerals of the element data is flagged. The document and the flagged element data are displayed in a user interface.

In one or more illustrative examples, a method for document analysis is provided. In a document, acronym data is captured including acronym definitions and acronym uses. In the document, claim data is captured including claim elements recited in one or more claims. The claim elements in the claim data are normalized based at least in part on the acronym definitions. Antecedent basis issues for the claim elements are identified. The claim data for which the claim elements fail to find antecedent basis in the claim elements are flagged. The document and the flagged claim data are displayed in a user interface.

In one or more illustrative examples, a non-transitory medium includes instructions for document analysis that, when executed by a processor cause the processor to perform operations including to capture, in a document, acronym data including acronym definitions and acronym uses; capture, in the document, element data including element numerals and element names corresponding to the element numerals; normalize the element names in the element data based at least in part on the acronym definitions; determine canonical names for each of the element numerals; flag the element data for which the normalized element names fail to match the canonical names for corresponding element numerals of the element data; and display the document and the flagged element data in a user interface.

In one or more illustrative examples, a non-transitory medium comprising instructions for document analysis that, when executed by a processor cause the processor to perform operations including to capture, in a document, acronym data including acronym definitions and acronym uses; capture, in the document, claim data including claim elements recited in one or more claims; normalize the claim elements in the claim data based at least in part on the acronym definitions; identify antecedent basis issues for the claim elements; flag the claim data for which the claim elements fail to find antecedent basis in the claim elements; and display the document and the flagged claim data in a user interface.

BRIEF DESCRIPTION OF THE DRAWINGS

The embodiments of the present disclosure are pointed out with particularity in the appended claims. However, other features of the various embodiments will become more apparent and will be best understood by referring to the following detailed description in conjunction with the accompany drawings in which:

FIG. 4 illustrates an example of the same portion of the patent specification document, but with instances of acronyms identified;

FIG. 5 illustrates an example of the same portion of the patent specification document, but with an element numbering issue identified;

FIG. 13 illustrates an example user interface of a corrected version of the document;

FIG. 14 illustrates an example user interface of a suggestions dropdown for use when drafting the specification text;

FIG. 16 illustrates an example of the same portion of the claims, with reference to antecedent basis for the term swivel chair;

FIG. 17 illustrates an example of the same portion of the claims, with reference to antecedent basis for the term CF;

FIG. 18 illustrates an example of the same portion of the claims, with reference to antecedent basis for inherent elements;

FIG. 20 illustrates an example of a claim set illustrating further examples for the determination of antecedent basis;

FIG. 21 illustrates an example user interface of the document, with flagged claim items underlined by indications in the document text;

FIG. 23 illustrates an example user interface of the document including the suggestions display having suggestions for resolving the flagged acronym; and FIG. 24 illustrates an example user interface of a suggestions dropdown for use when drafting the claim text;

FIG. 25 illustrates an additional example user interface of a suggestions dropdown for use when drafting the claim text;

DETAILED DESCRIPTION

Figure 1:
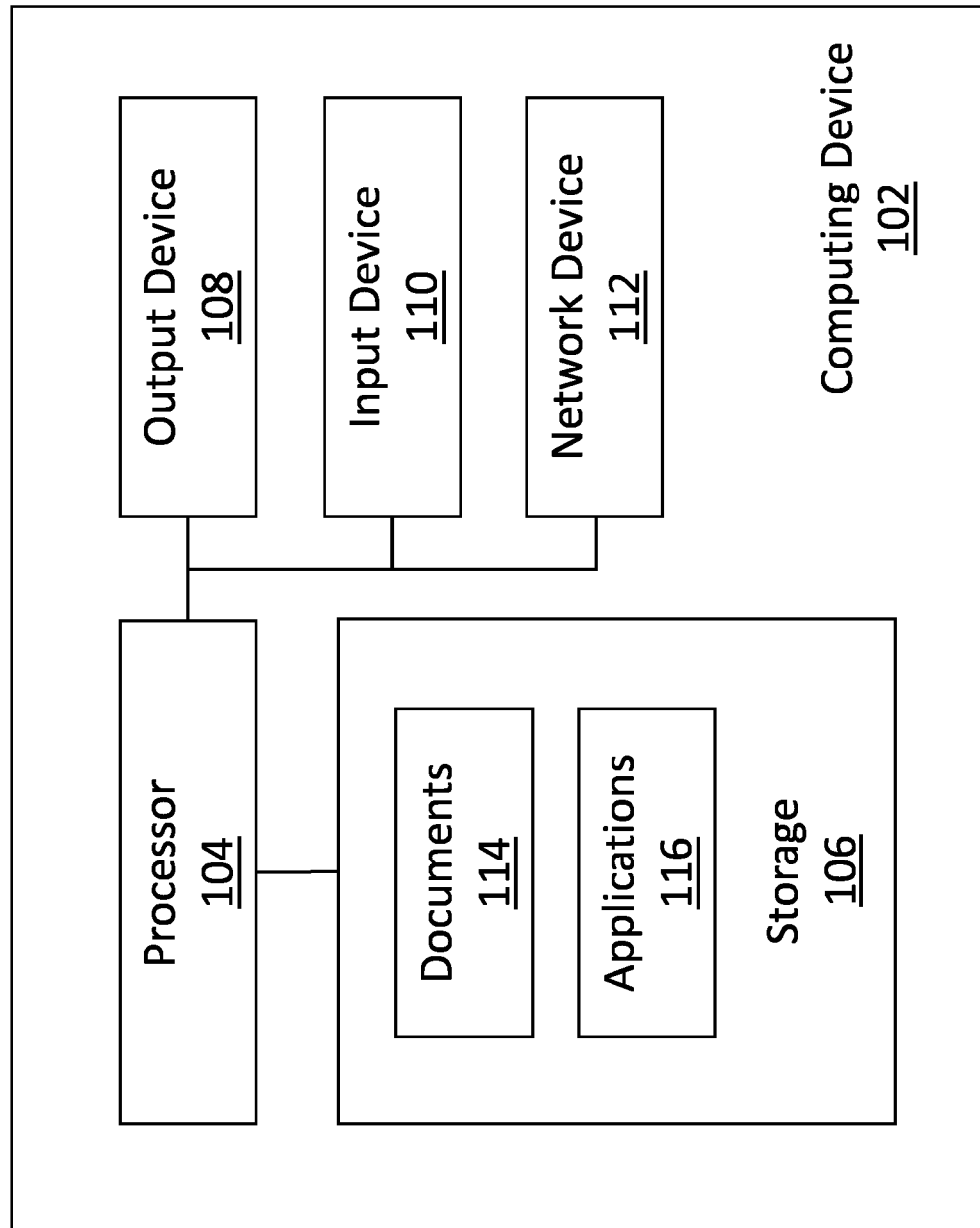
FIG. 1 illustrates a system including an example of a computing device for use in automated patent proofreading analysis, as well as for use of such analysis in providing writing aids for the drafting of patent applications.

As required, detailed embodiments are disclosed herein; however, it is to be understood that the disclosed embodiments are merely exemplary of the disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Reference numerals may be included in patent drawings to identify elements. These numbers may be referenced in the patent specification to allow for the discussion of those drawing elements. It is important to be consistent and correct with respect to the naming and numbering of elements. Yet, it may be difficult for a patent drafter to ensure that all patent numerals are correct.

A claim may be found to be indefinite when it contains words or phrases whose meaning is unclear. One of the ways a claim may be found to be indefinite is if there are terms in the claim that lack antecedent basis. A term may lack antecedent basis when it is referenced by a definite article, but it has not yet been introduced by an indefinite article. However, this is complicated by the fact that uncountable nouns and plurals do not always take the indefinite article. Indefiniteness may also be found in a claim when there is ambiguity with respect to what term is referenced by an element.

The approach to document analysis discussed in detail herein may be used to aid in the identification, visualization, correction, and prevention of such issues. Moreover, the captured data may be useful for drafting of the document instead of or in addition to being useful for identifying and providing suggested corrections. Further aspects of the disclosure are discussed in detail herein.

FIG. 1 illustrates a system 100 including an example of a computing device 102 for use in automated patent proofreading analysis, as well as for use of such analysis in providing writing aids for the drafting of patent applications. As shown, the computing device 102 may include a processor 104 that is operatively connected to a storage 106, an output device 108, an input device 110, and a network device 112. It should be noted that this is merely an example, and computing devices 102 with more, fewer, or different components may be used.

The processor 104 may include one or more integrated circuits that implement the functionality of a central processing unit (CPU) and/or graphics processing unit (GPU). In some examples, the processors 104 are a system on a chip (SoC) that integrates the functionality of the CPU and GPU. The SoC may optionally include other components such as, for example, the storage 106 and the network device 112 into a single integrated device. In other examples, the CPU and GPU are connected to each other via a peripheral connection device such as Peripheral Component Interconnect (PCI) express or another suitable peripheral data connection. In one example, the CPU is a commercially available central processing device that implements an instruction set such as one of the x86, ARM, Power, or Microprocessor without Interlocked Pipeline Stages (MIPS) instruction set families.

During operation, the processor 104 executes stored program instructions that are retrieved from the storage 106. The stored program instructions, accordingly, include software that controls the operation of the processors 104 to perform the operations described herein. The storage 106 may include both non-volatile memory and volatile memory devices. The non-volatile memory includes solid-state memories, such as NOT-AND (NAND) flash memory, magnetic and optical storage media, or any other suitable data storage device that retains data when the system 100 is deactivated or loses electrical power. The volatile memory includes static and dynamic random-access memory (RAM) that stores program instructions and data during operation of the system 100.

The GPU may include hardware and software for display of at least two-dimensional (2D) and optionally three-dimensional (3D) graphics to the output device 108 of the computing device 102. The output device 108 may include a graphical or visual display device, such as an electronic display screen, projector, printer, or any other suitable device that reproduces a graphical display. As another example, the output device 108 may include an audio device, such as a loudspeaker or headphone. As yet a further example, the output device 108 may include a tactile device, such as a mechanically raiseable device that may, in an example, be configured to display braille or another physical output that may be touched to provide information to a user.

The input device 110 may include any of various devices that enable the computing device 102 to receive control input from users. Examples of suitable input devices that receive human interface inputs may include keyboards, mice, trackballs, touchscreens, voice input devices, graphics tablets, and the like.

The network devices 112 may each include any of various devices that enable the computing device 102 to send and/or receive data from external devices over networks. Examples of suitable network devices 112 include an Ethernet interface, a Wi-Fi transceiver, a cellular transceiver, or a BLUETOOTH or BLUETOOTH Low Energy (BLE) transceiver, or other network adapter or peripheral interconnection device that receives data from another computer or external data storage device, which can be useful for receiving large sets of data in an efficient manner.

The storage 106 may be configured to maintain documents 114. These documents 114 may include, for example, documents 114 including patent specifications. In one example, the documents 114 may include documents 114 in the Office Open Extensible Markup Language (XML). In another example, the documents 114 may include documents 114 in Google Docs format. The storage 106 may be further configured to maintain one or more applications 116. The applications 116 may include instructions that, when executed by the processor 104 cause the computing device 102 to perform operations as discussed in detail herein. These applications 116 may include, for example word processors and document scanning tools. As explained in further detail herein, these applications 116 may be used to identify issues in the patent specifications stored in the documents 114.

Figure 2:
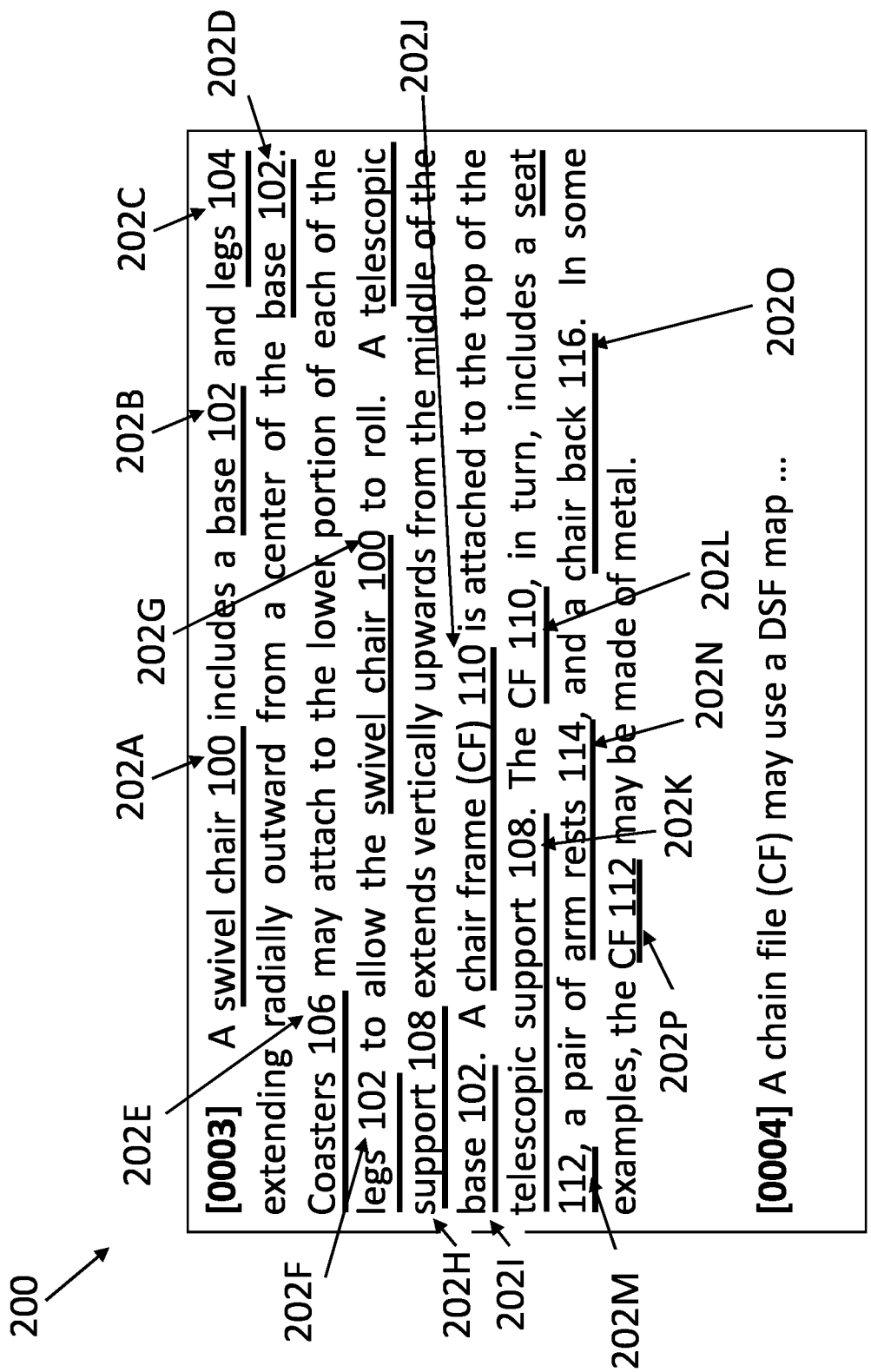
FIG. 2 illustrates an example of a portion of a patent specification document in which elements of the document are identified.

FIG. 2 illustrates an example 200 of a portion of a patent specification document 114. The portion includes paragraph [003] and a portion of paragraph [0004]. The portion of the specification discusses various parts of a swivel chair, including a base, legs, coasters, a telescopic support, a chair frame, a seat, arm rests, and a chair back. Each of these parts is referred to in the portion by a unique reference numeral (e.g., part number), where this same reference numeral is used to indicate the same elements in the patent drawings. For sake of example, these elements 202 of the document 114 are identified in the example 200 by underline.

By convention, the part name of the reference numeral typically comes immediately before the numeric values in the patent text. Each of these part numbers with its corresponding reference numeral is underlined in in the portion. As shown, the paragraphs discuss elements 202A-202O (collectively, elements 202).

The elements may be identifiable in the document 114 by the reference numerals. For instance, the swivel chair is referenced in the portion as element "100," the base is referenced as element "102," and so on. Thus, the elements 202 may be identified in the text by scanning the document 114 for numeric values that may be reference numerals. This scan may be performed, for example, by using a regular expression or other textual search for numeric values. As a simple example, a regular expression such as "[0-9] {2,}" may be used to locate instances of two or more consecutive numbers.

For each located reference numeral, the text of the document 114 may be scanned from before the reference numeral towards the beginning of the document until the entire element name is read in. The scan may be performed using various techniques. In a simple example, the scan may be performed in a backwards direction until a stop word or punctuation is reached. In another example, natural language processing (NLP) techniques, such as part of speech (POS) tagging or machine-learning models may be used to determine where a noun phrase ends (or likely ends). In yet a further example, each of the instances of an element 202 that has the same numeral may be compared to other instances of the element 202 having the same numeral to identify the most common word or words that are used to represent that element 202. Using the most common form, all other instances of the element 202 that include additional words before that common form may be shortened to the common form. Thus, the context of other uses of the same element 202 may be used to infer the proper element name. In an example, if an element 202 is used once as "running vehicle 234" and is used more times elsewhere as "vehicle 234", then the word "running" may be removed from that instance of the element 202 and all instances may be shortened to "vehicle 234". In some examples, if only one or a few instances of an element 202 are found, then factors such as POS may be weighted more heavily in determining the name of an element. In an example, if an element begins with a word that is likely to be a verb (e.g., "running vehicle 234"), then the word "running" may be removed from the name of the element 202. It should be noted that, as compared to the beginning location, the end location of the noun or noun phrase of the element is relatively easier to locate as the name terminates at the reference number.

Once located, each instance of an element 202 may be stored in a data structure. In an example, this data structure may include fields for information, such as, the beginning character location in the text for the element 202, the ending character location in the text for the element 202, the numeric value of the element numeral, the textual name for the element 202, etc.

Figure 3:
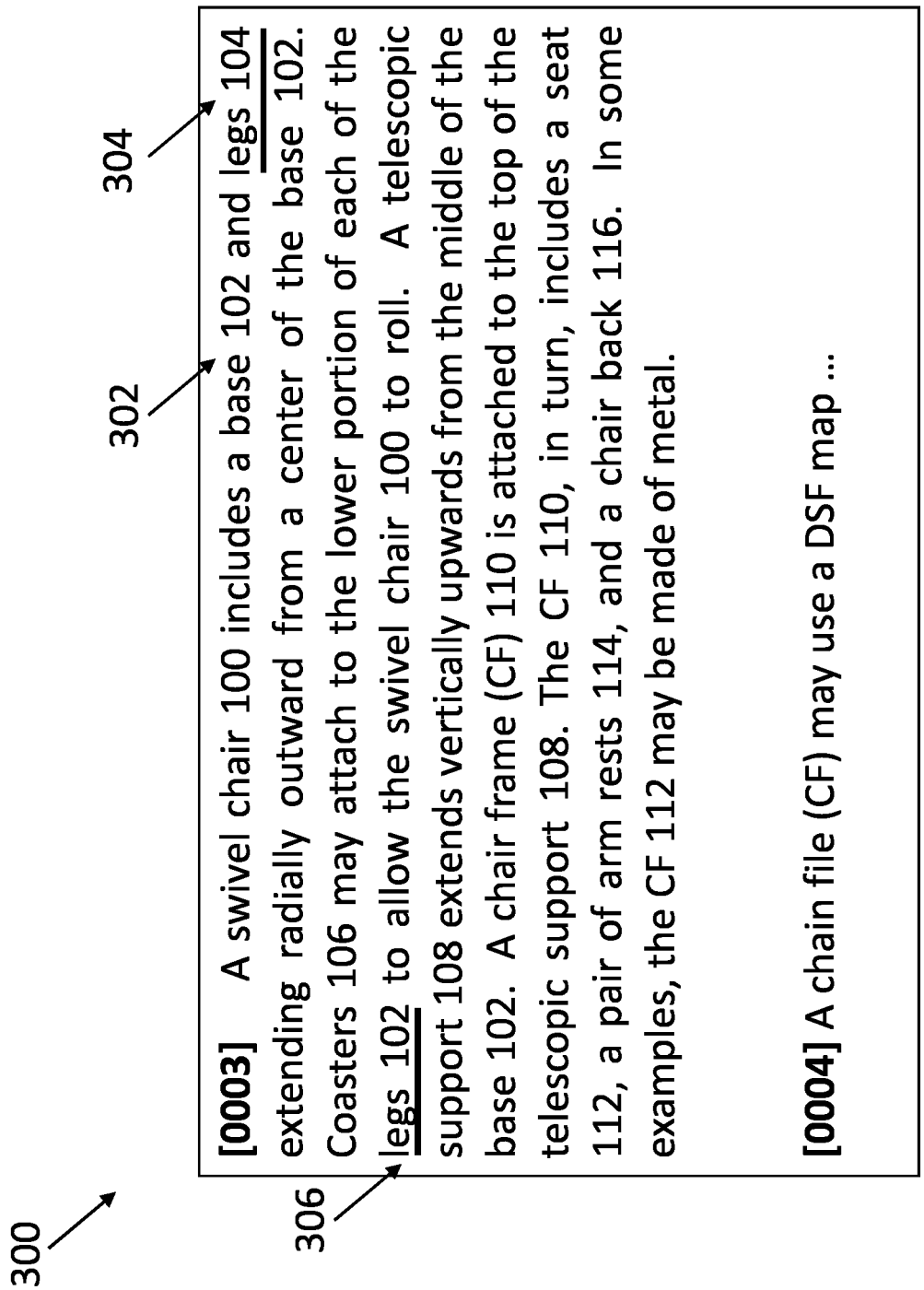
FIG. 3 illustrates an example of the same portion of the patent specification document, with an element identified using an acronym definition at a first instance, and with an acronym use at a second instance.

FIG. 3 illustrates an example 300 of the same portion of the patent specification document 114, but with an element numbering issue identified. As shown at 302, the element "base" is referred to using the numeral "102," and as shown at 304, the element "legs" is referred to using the numeral "104." However, at 506, the element "legs" is incorrectly referred to using the numeral "102."

In a simple approach, these and other incorrect numeral usages may be determined using the data structure. For instance, the application 116 may sort the data structure describing each of the identified elements 202 by element number and then flag the text of any element 202 names that fail to match the text for other uses of the element number. However, this may not be sufficient in many common cases. For instance, singular and plural forms of an element 202 should likely be indicated as a match, and not be flagged as a potential issue. To allow for this, the names of elements 202 may be converted into normalized names before performing the comparison. This normalized name may be, in an example, a singular representation of the word (e.g., feet becomes foot, vehicles becomes vehicle, etc.). Or, in the alternative, the element 202 names could be converted to a plural representation before comparing. Or, in a further example, the element 202 names may be stemmed into a word stem representation before comparing. This normalized element name may also be stored in the data structure of the elements 202.

FIG. 4 illustrates an example 400 of the same portion of the patent specification document 114, but with instances of acronyms identified. The acronyms may be identifiable in the document 114 due to the use of parentheticals for defining the acronyms. In addition, uses of acronyms in the text may be identified by words instances of all capitals. As shown, an acronym definition 402 for chair frame (CF) is indicated, as well as two instances of acronym use 404 of the acronym CF (shown as acronym uses 404A and 404B).

An acronym redefinition 406 of the acronym CF is also shown, but the second time as the noun phrase "chain file." This may be confusing, as it is now unclear whether CF refers to "chair frame" or "chain file" in the document 114. In some cases, while not shown, an acronym may be defined again using the same acronym definition 402. Such a situation may be less ambiguous, but may additionally be flagged, if desired.

An instance of an undefined acronym 408 is also shown. Here the acronym "DSF" lacks a definition. Because no definition is provided, it may unclear what is meant by DSF.

FIG. 5 illustrates an example 500 of a variation on the portion of the patent specification document 114, but with the acronym definition 402 appearing after the acronym is first used. As shown, a premature acronym use 502 for CF is shown, before the acronym definition 402 of CF first appears in the text.

Acronym redefinitions 406, undefined acronyms 408, and premature acronym uses 502 can be difficult to spot in the document 114, however. Additionally, these types of issues would not be picked up by a spell checker or grammar checker, as these are not spelling errors or grammatical errors. For instance, acronym redefinition 406 and premature acronym use 502 relate to the relative location of elements in the document 114 (e.g., before or after acronym definitions 402). However, such issues are not flagged by spell checkers or grammar checkers, which instead identify whether a word is spelled correctly in isolation (spelling of the word vs a list of correctly spelled words), or used correctly based on the immediate context of the sentence including the word (e.g., subject/verb agreement, singular/plural use, known listing of redundant or disfavored phrases, capitalization based on being the first word of a sentence, etc.).

Figure 6:
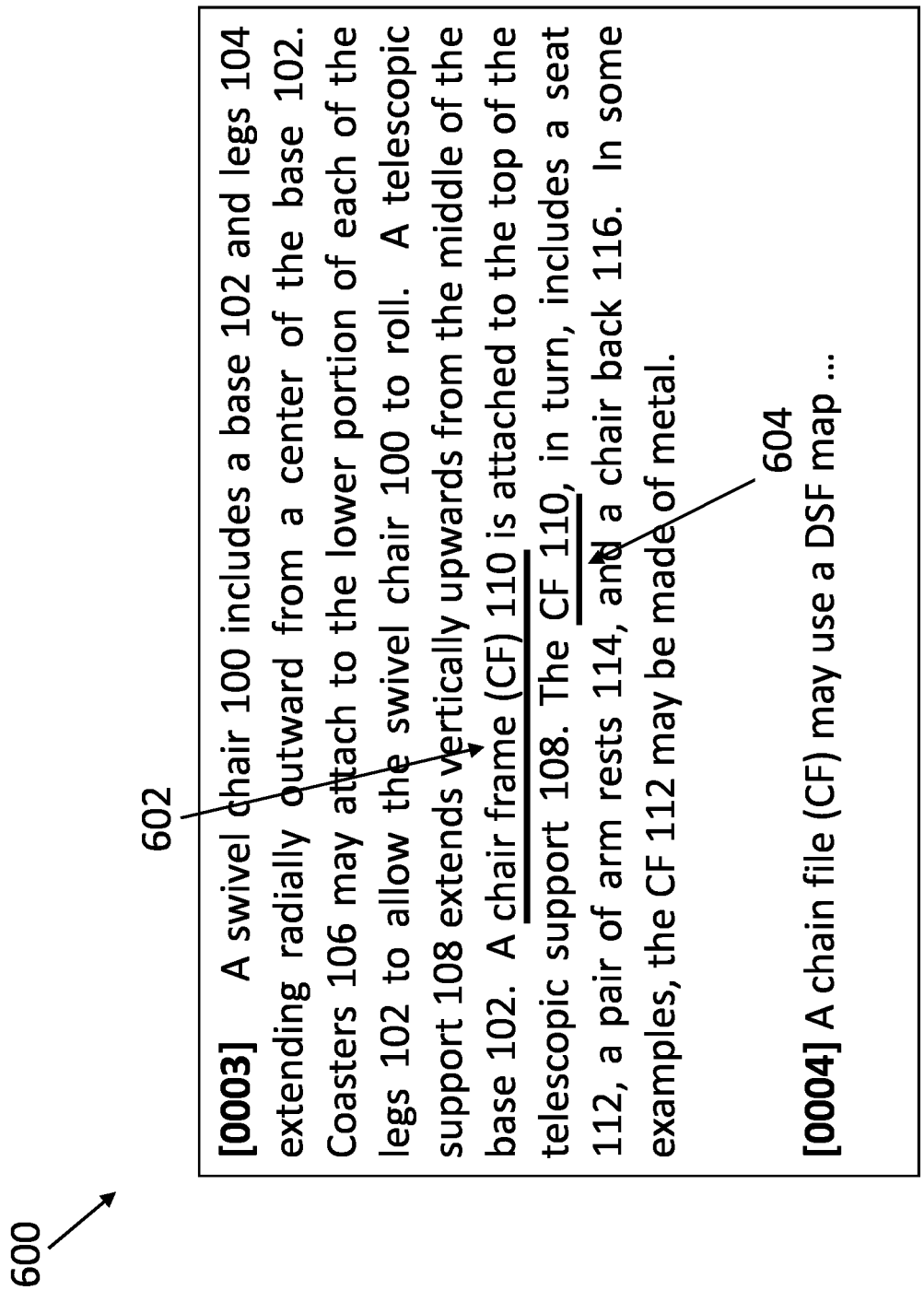
FIG. 6 illustrates an example of the same portion of the patent specification document, with an element identified using an acronym definition at a first instance.

FIG. 6 illustrates an example 600 of the same portion of the patent specification document 114, with an element identified using an acronym definition 402 at a first instance 602, and with an acronym use 404 at a second instance 604. In such a situation, the element name will not match, regardless of whether names are converted to singular, plural, or stemmed representations.

To confirm that the first instance 602 and the second instance 604 are a match, using the acronym definitions 402 located in the document 114, acronyms in element 202 names may be further processed into a consistent form. For instance, all acronym definitions 402 or expanded uses of acronyms may be converted into the shortened acronym use text before performing the comparison. In the alternative, acronyms may be covered into expanded form before performing the comparison. Using such an approach, elements 202 using or defining acronyms may be correctly compared to flag potential issues.

Thus, acronyms in the patent specification may be identified to aid in the mapping of element names to normalized names for the identification of numeral errors. This allows the user of the greater context of the document 114 to be used to aid in determining whether the element 202 are a match, as opposed to spell checker or grammar checker application. In addition, by scanning for and matching each of the element numerals and acronyms in a document 114, an interactive parts list of the document 114 may be displayed.

Figure 7:
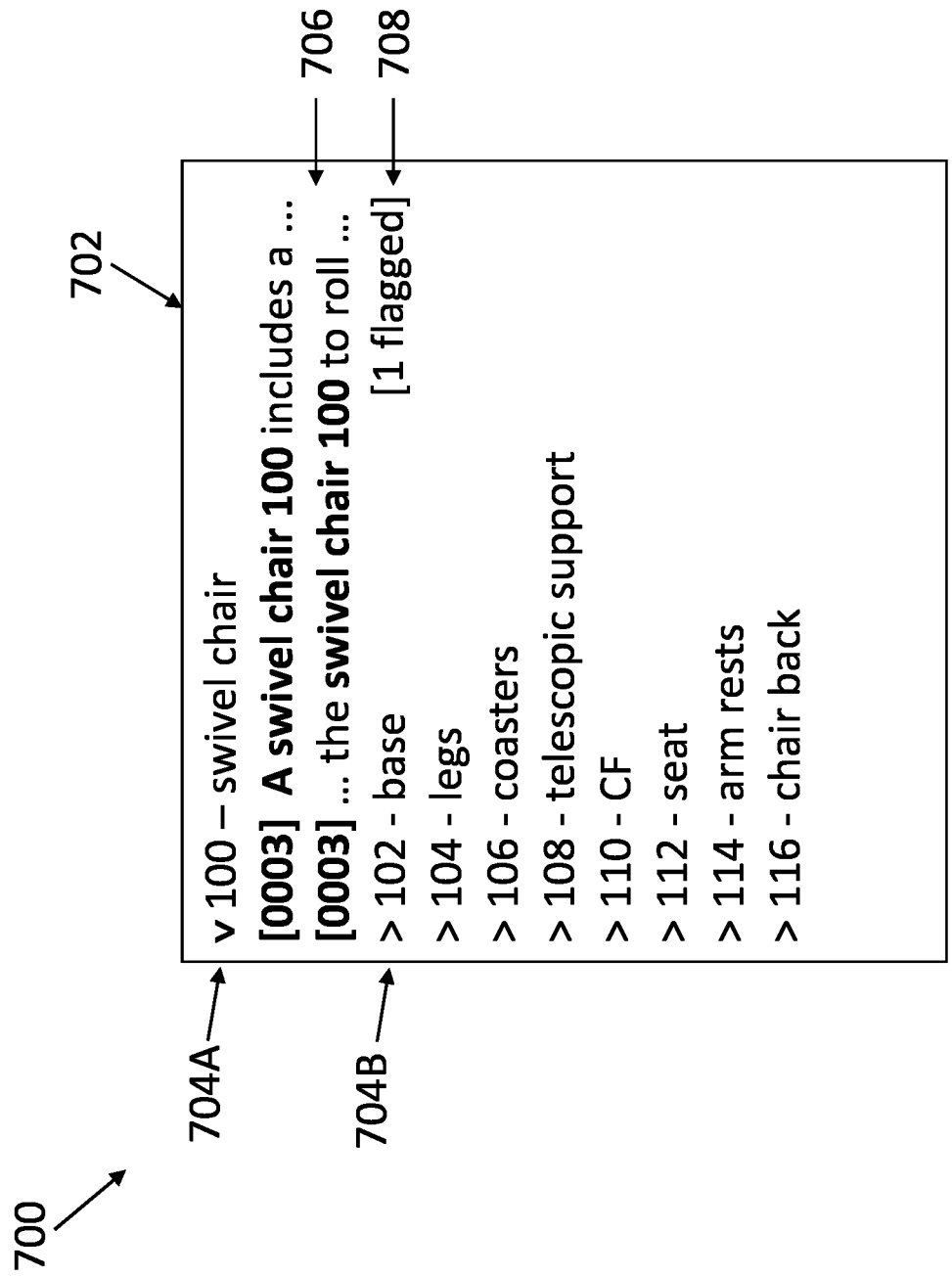
FIG. 7 illustrates an example user interface of a tree control in an element numeral mode, showing each of the elements and their respective locations within the document.

FIG. 7 illustrates an example user interface 700 of a tree control 702 in an element numeral mode, showing each of the elements 202 and their respective locations within the document 114. As shown, each of the elements 202 identified in the text of the document 114 is presented in the tree control 702 as an expandable section. This tree control 702 may be displayed, in an example, in a view of the word processor application 116. In some examples, both the tree control 702 and a display of the document 114 may be shown at once, e.g., alongside one another.

Each of the sections 704 in the tree control 702 may include a listing of the elements 202 having the corresponding element numeral. These sections 704 can be expanded (e.g., by clicking on them with a mouse pointer) to show the instances of the elements 202 with the numeral. These sections 704 can be collapsed (e.g., by clicking on them again) to reduce the screen space required for display of the tree control 702.

In FIG. 7, the first section indicated at 704A is expanded. This is indicated in the user interface 700 via the icon to the left of the term. As can be seen, the two instances of the use of the "swivel chair" element in the text are shown in the tree control 702. Because the locations of these elements 202 can be identified in the text, selection of the elements from the tree control 702 may allow the application 116 to highlight the corresponding text in the document 114. The second sections 704 indicated at 704B is shown as unexpanded. This is similarly indicated in the user interface 700 via the icon to the left of the term.

Moreover, flag indications 710 may further be provided in the tree control 702 to indicate to the user which element numerals have flagged items. For instance, there is a flagged item for the "base" element, as discussed above with respect to FIG. 3.

In a variation, icons or other indications may be provided in the tree control 702 for each of the elements 202 to visually indicate the class of the elements 202 (process/method, system/apparatus, computer-readable medium, etc.). In one nonlimiting example, the icons may be placed to the left of the indication of the elements 202. The class of the respective element 202 may be determined, for example, by searching for keywords in the text of the respective elements 202. For instance, if the text of the element 202 contains or ends with one or more of the words "process" or "method" or "operation" or "decision" or "step" or "block", then the element 202 may be considered to be a method class element 202. Or, if the element 202 contains or ends with the words "medium" or "computer-readable medium" or "computer program product" or "storage" or "memory" then the element 202 may be considered to be a Beauregard claim element. Or if no text is ever used for an element 202, then an unknown icon such as a question mark may be used to indicate the unknown class of that element 202.

Figure 8:
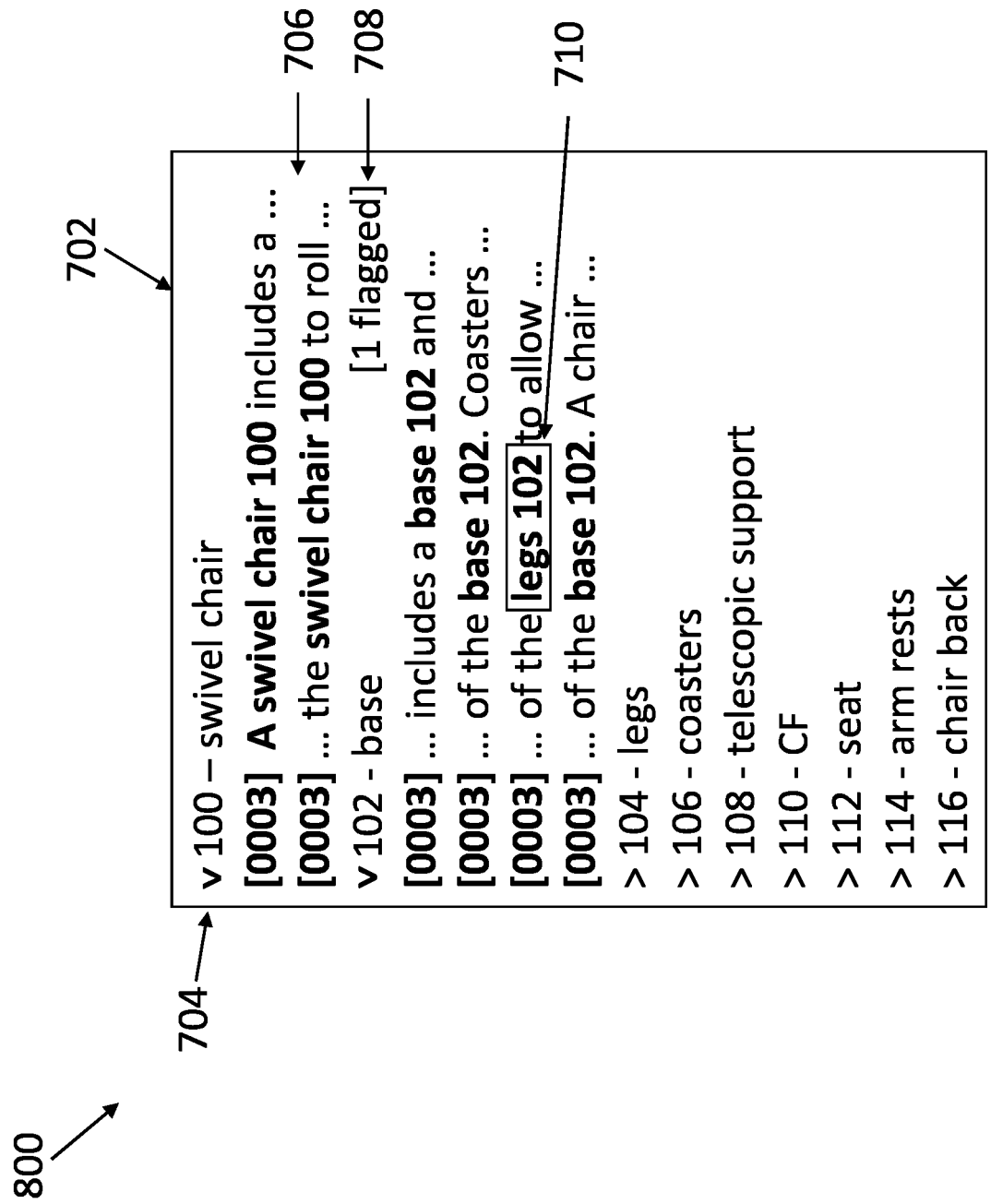
FIG. 8 illustrates an example user interface of the tree control with the base element also expanded.

FIG. 8 illustrates an example user interface 800 of the tree control 702 with the base element also expanded. As can be seen in three of the four instances of the base element 202, the element numeral is as the word "base." However, in the third of the four instances, the element numeral is referred to as the "legs," which is actually element numeral "104." The tree control 702 may show the flagged element with a highlight 708, which is shown as a box in the user interface 800. It should be noted that this is only one way to show a highlight, and the flagged element may be indicated by color or symbol or some other approach. While not shown in the user interface 800, the tree control 702 may also be filtered to only show flagged items, as another possibility.

Figure 9:
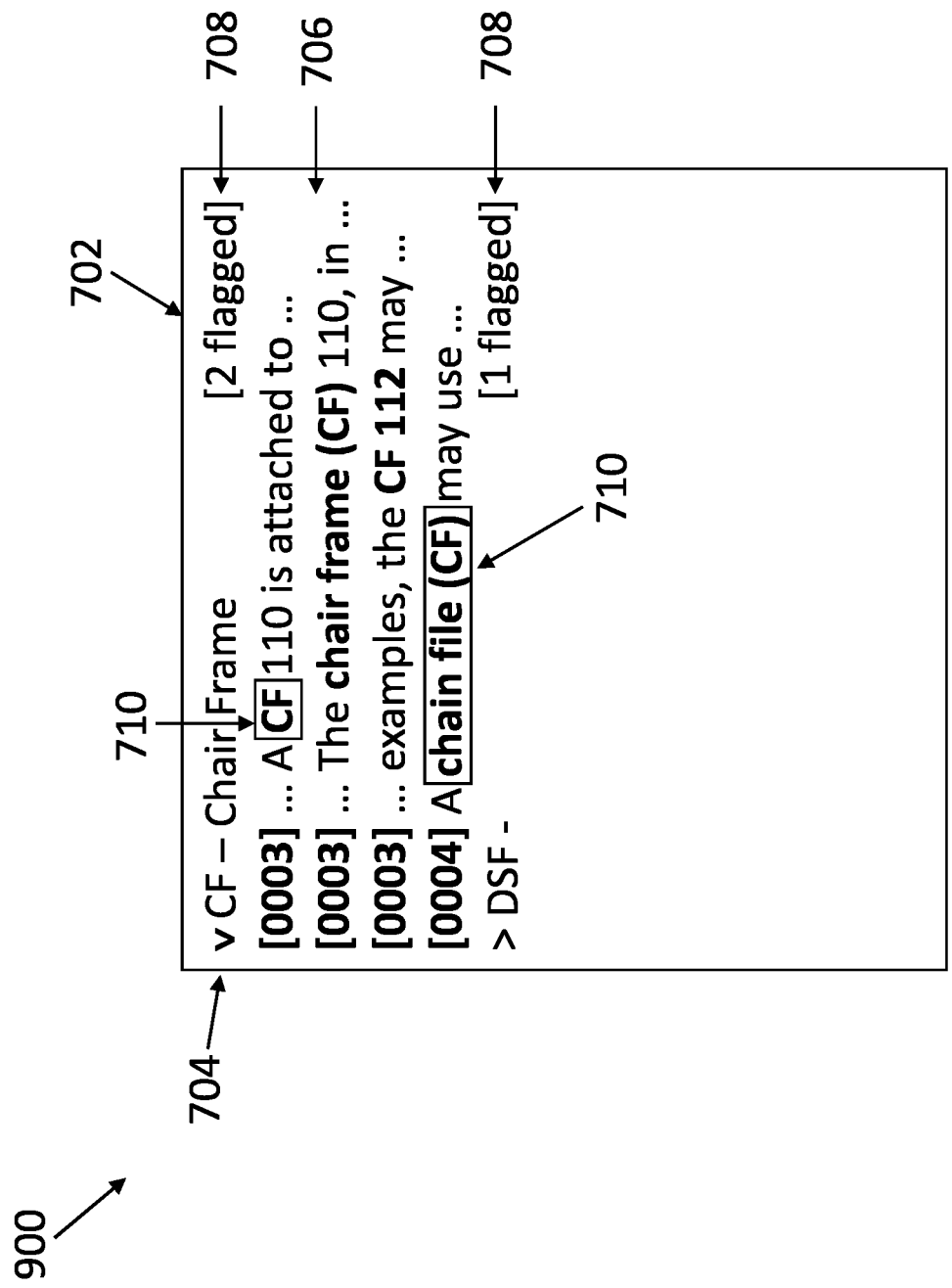
FIG. 9 illustrates an example user interface of the tree control in an acronym mode, showing each of the acronyms and their respective locations within the document.

FIG. 9 illustrates an example user interface 900 of the tree control 702 in an acronym mode, showing each of the acronyms and their respective locations within the document 114. Similar to with element numerals, each of the sections 704 may be expandable to show the details for the respective acronym. Also similar to with the element numerals, flag indications 710 may be indicated to show which sections 704 include flagged items and how many.

Here, two acronym elements are flagged for the chair frame-a premature acronym use 502 before the acronym definition 402, and an acronym redefinition 406 after the acronym definition 402. These flag indications 710 are consistent with the document 114 as shown in FIG. 4. Additionally, while not expanded, the undefined acronym 408 for DSF is also indicated in the user interface 900. Significantly, the same acronym data that is used to generate the names of the element numerals can also be used to generate the user interface 900 listing of the acronyms in the document 114.

Figure 10:
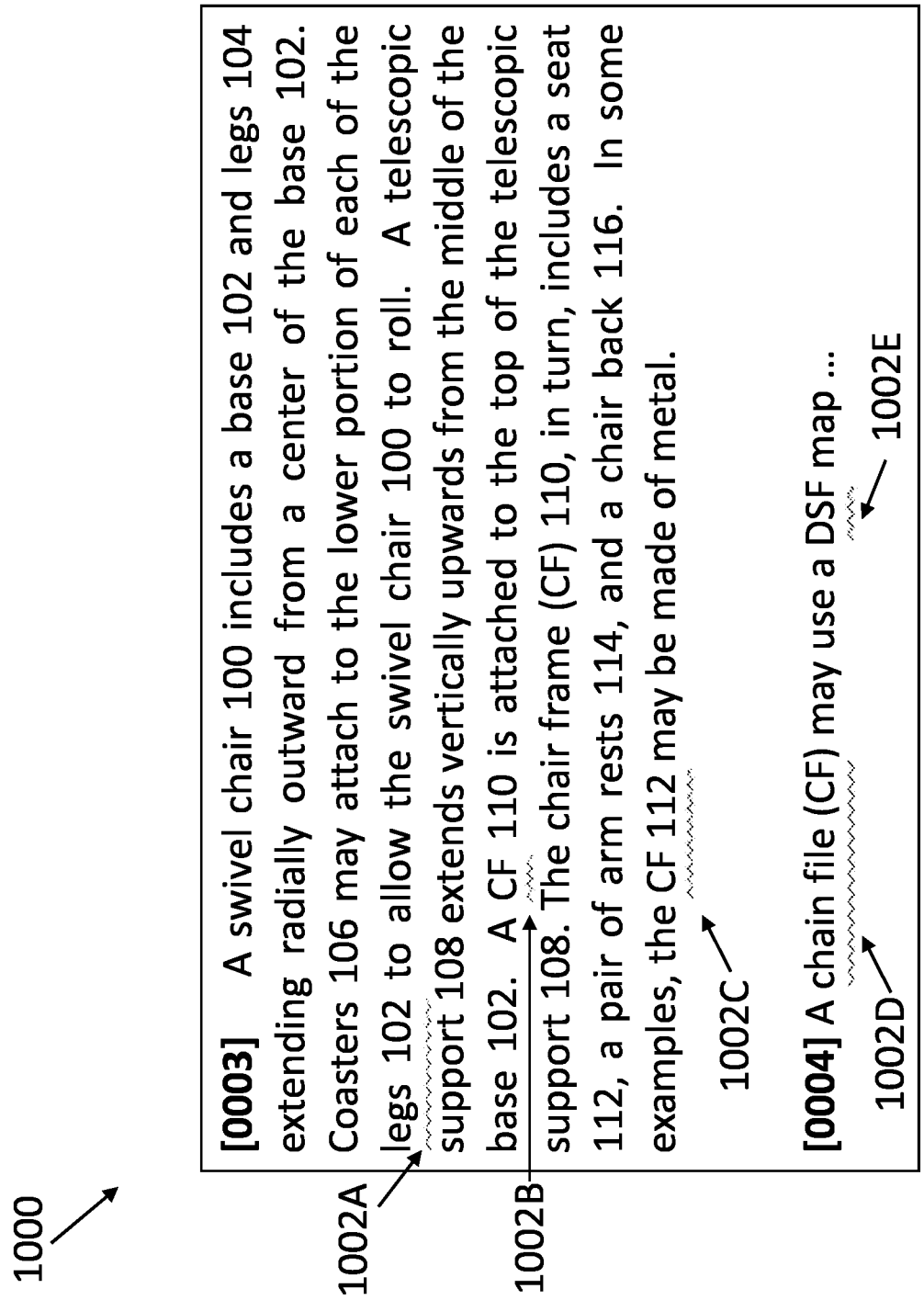
FIG. 10 illustrates an example user interface of the document, with the flagged items underlined by indications in the document text.

FIG. 10 illustrates an example user interface 1000 of the document 114, with the flagged items underlined by indications 1002 in the document 114 text. This allows a user of the application 116 to see the locations of the flagged items in the context of the document 114 itself. As shown, the indication 1002A shows the incorrect name "legs" used for the element "102," the indication 1002B shows the premature acronym use 502 of CF, the indication 1002C shows an incorrect numeral used for the element seat element, the indication 1002D shows the acronym redefinition 406 of the acronym CF, and the indication 1002E shows the undefined acronym 408 use for DSF. Here again, the same element numeral data and acronym data that is used for the tree control 702 may additionally be used to be used to generate the indications 1002 for the user interface 1000 display of the document 114.

Figure 11:
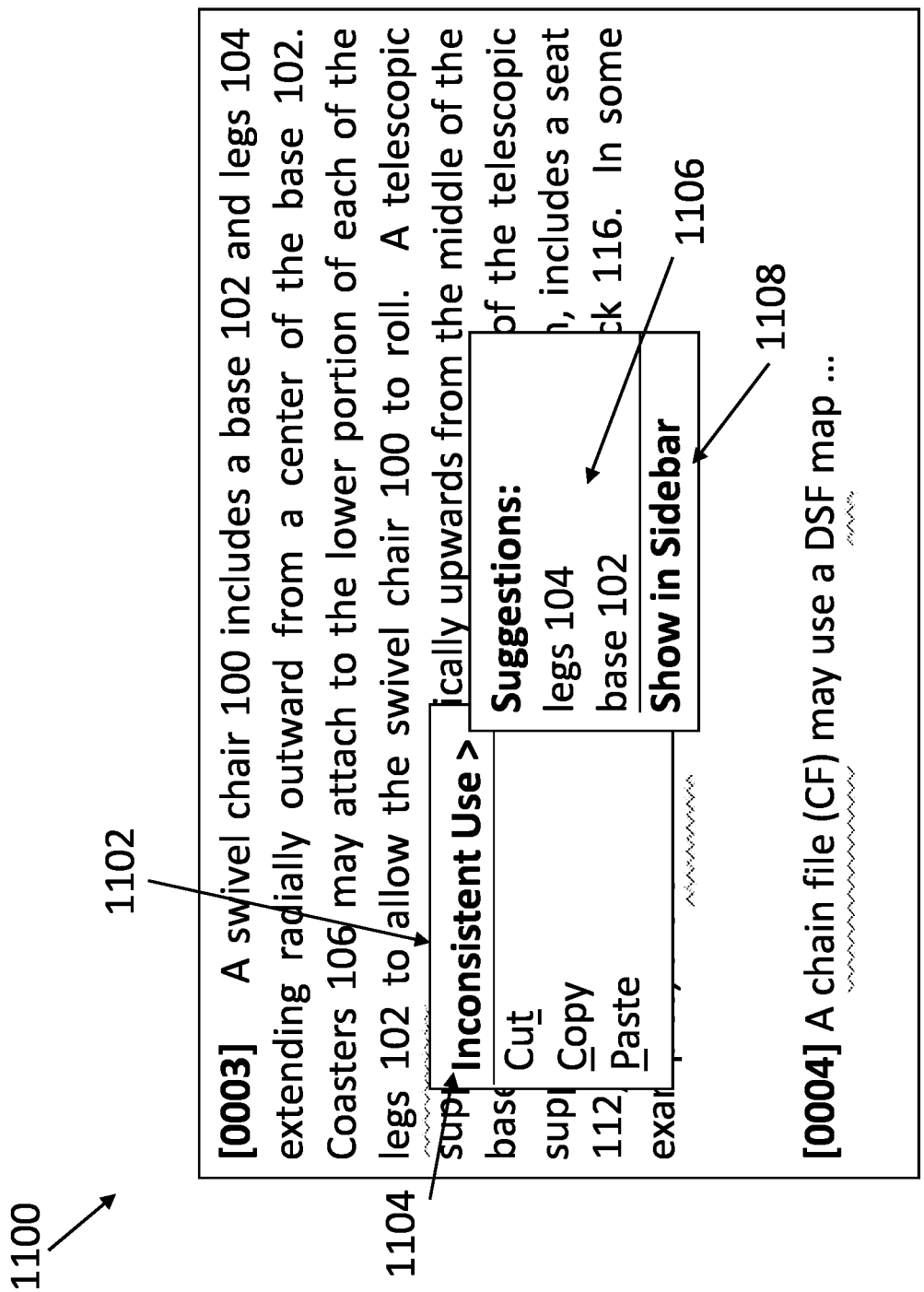
FIG. 11 illustrates an example user interface of the document including a suggestions display having suggestions for resolving a flagged element numeral.

FIG. 11 illustrates an example user interface 1100 of the document 114 including a suggestions display 1102 having suggestions for resolving a flagged element numeral. The suggestions display 1102 may be invoked, for example, as a context menu by a user right-clicking on the flagged item indicated by the indication 1002A. This is only one example and various other user interface actions may be used to invoke the suggestions display 1102. For instance, a left mouse click or a key press may be used to cause the application 116 to bring up the suggestions display 1102, which may be a window or other user interface other than a menu. Or, a wizard view may be used to iteratively walk a user through the list of flagged items (e.g., in the order that the indications 1002 appear in the document 114). Or, clicking or otherwise selecting an instance of an element 202 from the tree control 702 may invoke the suggestions display 1102 for that corresponding element 202, (or acronym or claim element), depending on the view of the tree control 702.

The suggestions display 1102 may include a reason indication 1104 specifying why the text was flagged (here, inconsistent element numeral use). The suggestions display 1102 may further include a listing of corrections 1106 for the flagged item. In the illustrated example, the listing of corrections 1106 includes, as examples, the indicated numeral with the correct text (i.e., "legs 104") as well as the document text with the correct numeral (i.e., "base 102"). The user may select from these choices to have the respective corrected text replace the flagged text of the indication 1002. The suggestions display 1102 may further include a show in sidebar 1108 item that, when selected, scrolls into view and/or highlights the selected indication 1002 in the tree control 702. This may allow the user to view the instance of the selected indication 1002 in the context of other instances of the same element 202, which may be useful in determining and confirming the corrected text.

Figure 12:
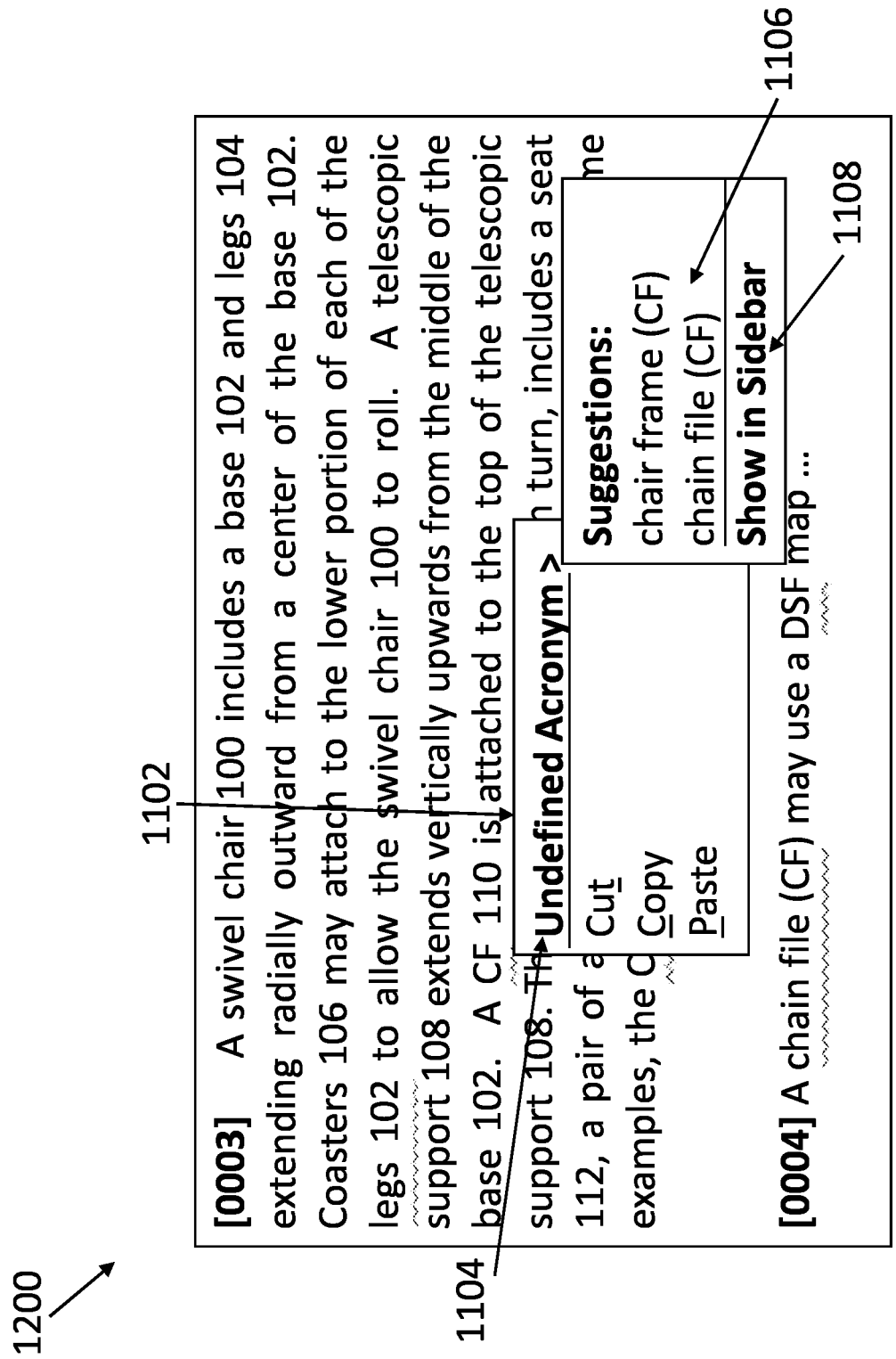
FIG. 12 illustrates an example user interface of the document including the suggestions display having suggestions for resolving a flagged acronym.

FIG. 12 illustrates an example user interface 1200 of the document 114 including the suggestions display 1102 having suggestions for resolving a flagged acronym. Similar to the user interface 1100, in the user interface 1200 the suggestions display 1102 includes a reason indication 1104 specifying why the text was flagged (here, an undefined acronym 408), as well as a listing of corrections 1106 (here, based on the acronym definitions 402 for the acronym located later in the document 114). It should also be noted that, instead of or in addition to the acronyms located in the document 114, these suggestions for undefined acronyms 408 may be determined based on information external to the document 114 itself, such as by querying a listing or database of acronym definitions 402. This database may be created, in an example, by searching a corpus of patent documents 114 for acronym definitions 402. For instance, this corpus may be of other patent documents 114 in the same or similar patent classification category, so as to facilitate the identification of terms in the relevant art.

FIG. 13 illustrates an example user interface 1300 of a corrected version of the document 114. The corrected version of the documents 114 may have been created by using the suggestions display 1102 for each of the indications and selecting from the corrections 1106. As each of the flagged indications 1002 has been resolved, there are no longer any indications 1002 shown on the document 114.

It should be noted that the captured element data and acronym data may be useful for drafting of document 114 instead of or in addition to being useful for identifying and providing suggested corrections.

FIG. 14 illustrates an example user interface 1400 of a suggestions dropdown 1402 for use when drafting the specification text. The suggestions dropdown 1402 may be configured to include a listing of those elements 202 that match with the text currently being typed by the user (or a subset of those elements 202 that are a match). For instance, in the user interface 1400, the user is starting to type a word that begins with the letter "c." Based on that, the application 116 may identify whether any terms in the patent document 114 match the selected text. As shown, the terms "swivel chair 100," "coasters 106," and "CF 110" each include a word that begins with the letter "c." Thus, these words are shown in the suggestions dropdown 1402, which may be placed in the user interface 1400 near the current caret location at which the user is typing. The letter "c" is further shown in highlight in the suggestions dropdown 1402, to allow the user to understand why the choices have been included in the suggestions dropdown 1402.

Variations on the illustrated suggestions dropdown 1402 are possible. For instance, in other examples, any word that includes the letter types in may be included. In yet a further example, the term may only be included in the suggestions dropdown 1402 if the first word of the term matches to the typed in text.

In another variation, icons or other indications may be provided in the suggestions dropdown 1402 for each of the elements 202 to visually indicate the class of the element 202. These icons may be the same as those shown in the tree control 702 when in the element numeral mode. In one nonlimiting example, the icons may be placed to the left of the indication of the claim element 202 in the suggestions dropdown 1402.

As further text is typed in, the choices may narrow or disappear. For instance, if the user types in an "a" such that the word is now "ca," then there are no matches and the suggestions dropdown 1402 may disappear. If the user types in an "o" such that the word is now "co," the choice "coasters 106" may be the only choice remaining in the suggestions display 1102. In such a case, that element may be highlighted such that pressing tab allows for the selected item to be pasted into the document 114. If there are multiple choices in the suggestions display 1102, the up and down arrow keys may be used to make a selection and tab may be used to paste that selection into the document 114. The escape key may be used to close the suggestions dropdown 1402 if none of the choices are desired. Or, the user may continue to type ignoring the suggestions dropdown 1402, as without hitting tab the suggestions dropdown 1402 takes no action with respect to the text of the document 114. It should be noted that this is only one possible approach with respect to automatic suggestions, and other approaches may be used. For instance, other keys or combinations of keys may be used to control the operation of the suggestions dropdown 1402. Or, the suggestions may be drawn inline in the document 114 in a different color or other manner to indicate the proposed suggestion. Significantly, the data used to provide the information for the suggestions dropdown 1402 may be the same data that used to populate the tree control 702 as well as to draw the indications 1002.

Figure 15:
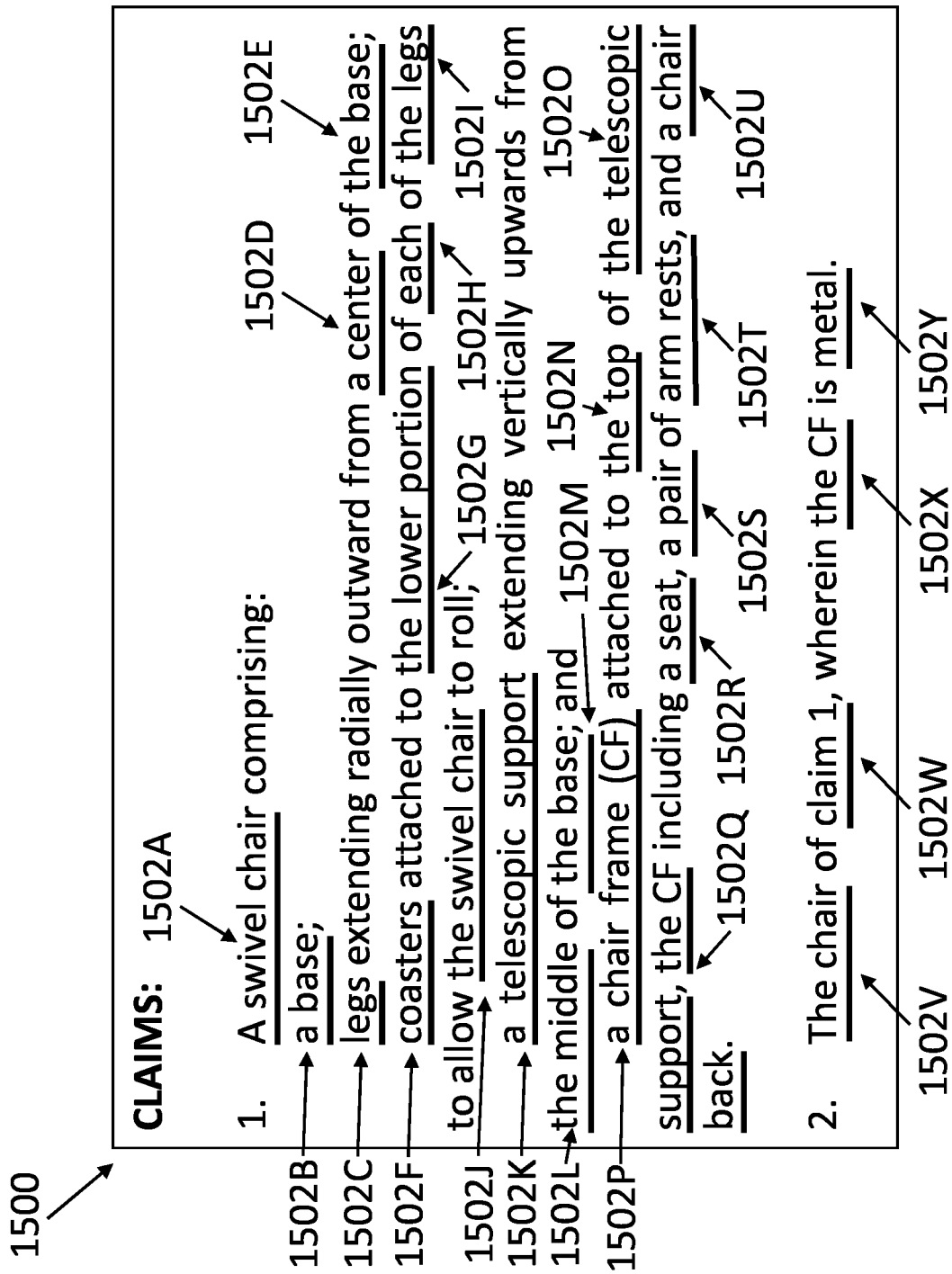
FIG. 15 illustrates an example of a claim set directed to the subject matter of the portion of the documents shown in FIG. 2.

FIG. 15 illustrates an example 1500 of a claim set directed to the subject matter of the portion of the documents 114 shown in FIG. 2. Each element 1502A-1502Y (collectively elements 1502) recited in the claims is shown as underlined in the text of the claim set. Significantly, as compared to the text of the document 114 in FIG. 2, the elements of the claim do not each end in a reference numeral. Thus, as compared to the identification of elements 202 in the document 114 specification, the end of the test of each of the elements 1502 of the claims is not readily identifiable in the document 114 by a reference numeral. Instead, to locate the element 1502 in the claim set, other techniques such as natural language processing, part of speech tagging, machine-learning models, etc. may be used to determine where a noun phrase begins or ends.

As with the elements 202, once located the elements 1502 may be added to a data structure for processing, the data structure including fields for the beginning character location in the text for the element 1502, the ending character location in the text for the element 1502, the textual name for the element 1502, etc. Then, using the data, instead of identifying consistency among reference numerals and their corresponding text, antecedent basis can be confirmed or flagged based on the identification of the elements 1502.

A claim is indefinite when it contains words or phrases whose meaning is unclear. One of the ways a claim may be found to be indefinite is if there are terms in the claim that lack antecedent basis. A term lacks antecedent basis when it is referenced by a definite article, but it has not yet been introduced by an indefinite article. However, this is complicated by the fact that uncountable nouns and plurals do not always take the indefinite article. Indefiniteness may also be found in a claim when there is ambiguity with respect to what term is referenced by an element 1502.

To determine whether the claims include antecedent basis issues, each use of a term introduced with a definite article can be verified against each term that appears earlier in the claim to determine whether antecedent basis is found. Additionally, each introduction of a term can be verified against each term that appears earlier in the claim to determine whether that introduction is a duplicate of an earlier introduction.

FIG. 16 illustrates an example 1600 of the same portion of the claims, with reference to antecedent basis for the term swivel chair. As shown, the element "swivel chair" is introduced as "a swivel chair." This same element is again referred to with proper antecedent basis as "the swivel chair." Thus, for this second element antecedent basis is easily found. This element is again referred to in shortened form as "The chair" in claim 2. While the word "swivel" is not repeated in this instance, there is no other chair in the claim, so therefore this reference is unambiguous. Each of these uses may therefore be proper.

FIG. 17 illustrates an example 1700 of the same portion of the claims, with reference to antecedent basis for the term CF. As shown, the element "CF" is introduced as "a chair frame (CF)," including an acronym definition 402. Later in the claim, the element is referenced as the shortened acronym use 404 "the CF." Although the text of these elements 1502 is not a match, the second term correctly relates back and should find antecedent basis in the first instance.

To confirm that the first instance and the second instance are a match, using the acronym definitions 402 located in the document 114, acronyms in element 1502 names may be further processed into a consistent form. For instance, all acronym definitions 402 or expanded uses of acronyms may be converted into the shortened acronym use text before performing the comparison. In the alternative, acronyms may be covered into expanded form before performing the comparison. Using such an approach, elements 1502 using or defining acronyms may be correctly compared to flag potential issues. Thus, acronyms in the patent claims (or elsewhere in the specification) should be identified to aid in the mapping of element names to normalized names for the identification of numeral errors.

FIG. 18 illustrates an example 1800 of the same portion of the claims, with reference to antecedent basis for inherent elements. As shown, the terms "the lower portion" and "the top" are each referenced using the definite article "the," but are not introduced earlier in the claim. However, inherent components of elements may have antecedent basis in the recitation of the components themselves. For example, an example given in the Manual of Patent Examining Procedure (MPEP) of the United States Patent and Trademark Office (USPTO) is that the limitation "the outer surface of said sphere" would not require an antecedent recitation that the sphere has an outer surface. Thus, certain terms may be considered to find antecedent basis without explicit introduction. In some cases, this may be only if the component is properly introduced. For instance, if no sphere was introduced, then there could be no antecedent basis for "said sphere" or for "the outer surface of said sphere."

Figure 19:
FIG. 19 illustrates an example user interface of the tree control in a claim element mode.

FIG. 19 illustrates an example user interface 1900 of the tree control 702 in a claim element 1502 mode. As shown, each of the claims identified in the text of the document 114 is presented in the tree control 702 as an expandable section. This tree control 702 may be displayed, in an example, in a view of the word processor application 116. In some examples, both the tree control 702 and a display of the document 114 may be shown at once, e.g., alongside one another. This may be helpful, for instance, to show the tree control 702 in a sidebar and also the document 114 responsive to selection of the show in sidebar 1108 menu item.

Each of the sections 704 in the tree control 702 may include a listing of the elements 202 in the respective claim. These sections 704 can be expanded (e.g., by clicking on them with a mouse) to show the instances of the elements 1502 with the numeral. These sections 704 can be collapsed (e.g., by clicking on them again with a mouse) to reduce the screen space required. In some examples, icons or other indications may be provided in the tree control 702 for each of the claims to visually indicate the class of the claim (process/method, system/apparatus, computer-readable medium, etc.). In one nonlimiting example, the icons may be placed to the left of the indication of the indication of the claim number. In an example, the class of the claim may be determined by searching for keywords in the preamble of the claim. For instance, if the preamble contains the words "process" or "method", then the claim may be considered to be a method claim. Or, if the preamble contains the words "medium" or "computer-readable medium" or "computer program product" then the claim may be considered to be a Beauregard claim. If none of these words appear, then the claim may default to being of a system or apparatus class. In some cases, instead of searching for words in the preamble, the class of the claim may be determined based on whether any elements 1502 of the preamble claim include or end in words that indicate the class of the claim. For instance, if the claim includes an element 1502 that ends in and/or includes the word "process" or "method", then the claim may be considered to be a method claim. Or, if the claim includes an element 1502 that ends in and/or includes the words "medium" or "computer-readable medium" or "computer program product", then the claim may be considered to be a method claim. If no such words are found in the element 1502 of the preamble, then the claim may be considered to be a system or apparatus claim. Using this class information, the system 100 may also flag claims that depend from a different claim class and may display that information, e.g., in the tree controls 702 or as an underline or other indication in the document 114 (e.g., under the claim dependency, under the mismatched element 1502 term indicating the class, etc.)

In some examples, the listing of claims via the expandable sections may be listed in claim order. In other examples, the listing of claims may be listed in the order in which the items appear in the document 114. In yet other examples, the listing of claims may appear in dependency order, with dependent claims indented and below their corresponding base claim. For instance, in the example of FIG. 18, claim 2 depends from claim 1. Accordingly in an alternate example of the user interface 1900, the expandable item for claim 2 may be shown as below and indented (e.g., to the right) with respect to the expandable item for claim 1.

FIG. 20 illustrates an example 2000 of a claim set illustrating further examples for the determination of antecedent basis. In the claim shown in FIG. 15, the term "the legs" finds antecedent basis in the introduction "legs." However, this is not the only possible way for a plural term to find antecedent basis. In other examples, a plural term may find antecedent basis in multiple introductions of a singular of the term. As shown in the example 2000, the term "the legs" finds antecedent basis in both of "a first leg" and "a second leg." Significantly, both of these terms must be present, and one of them alone would be insufficient to introduce plural "legs."

Also shown in the example 2000, the term "attached leg" finds antecedent basis in "attaching legs." Here, it should be noted that a verb preceding a noun may, in some cases, be allowed for when locating antecedent basis. For instance, the verb that acts on the term may be identified (e.g., as the verb preceding the element) for use in confirming that a later element 1502 is, in fact, a match.

FIG. 21 illustrates an example user interface 2100 of the document 114, with flagged claim items underlined by indications 1002 in the document 114 text. This allows a user of the application 116 to see the locations of the flagged items in the context of the claim set in the document 114 itself. As shown, the indication 1002A shows the claim element 1502 "the base" lacks antecedent basis, the indications 1002B, 1002C each show an additional instance of the claim element 1502 "the base" lacking antecedent basis, and the indication 1002D shows the premature acronym use 502 of CF.

It should also be noted that other types of issues may be flagged in the claim set. For instance, claim numbering errors may also be indicated by verifying that the claims in the claim set appear in numeric order. As shown, an indication is noted below the number 3, as there is no claim 2 preceding claim 3. Significantly, the same claim data and acronym data that is used for the tree control 702 may additionally be used to be used to generate the indications 1002 for the user interface 2100 display of the document 114.

Figure 22:
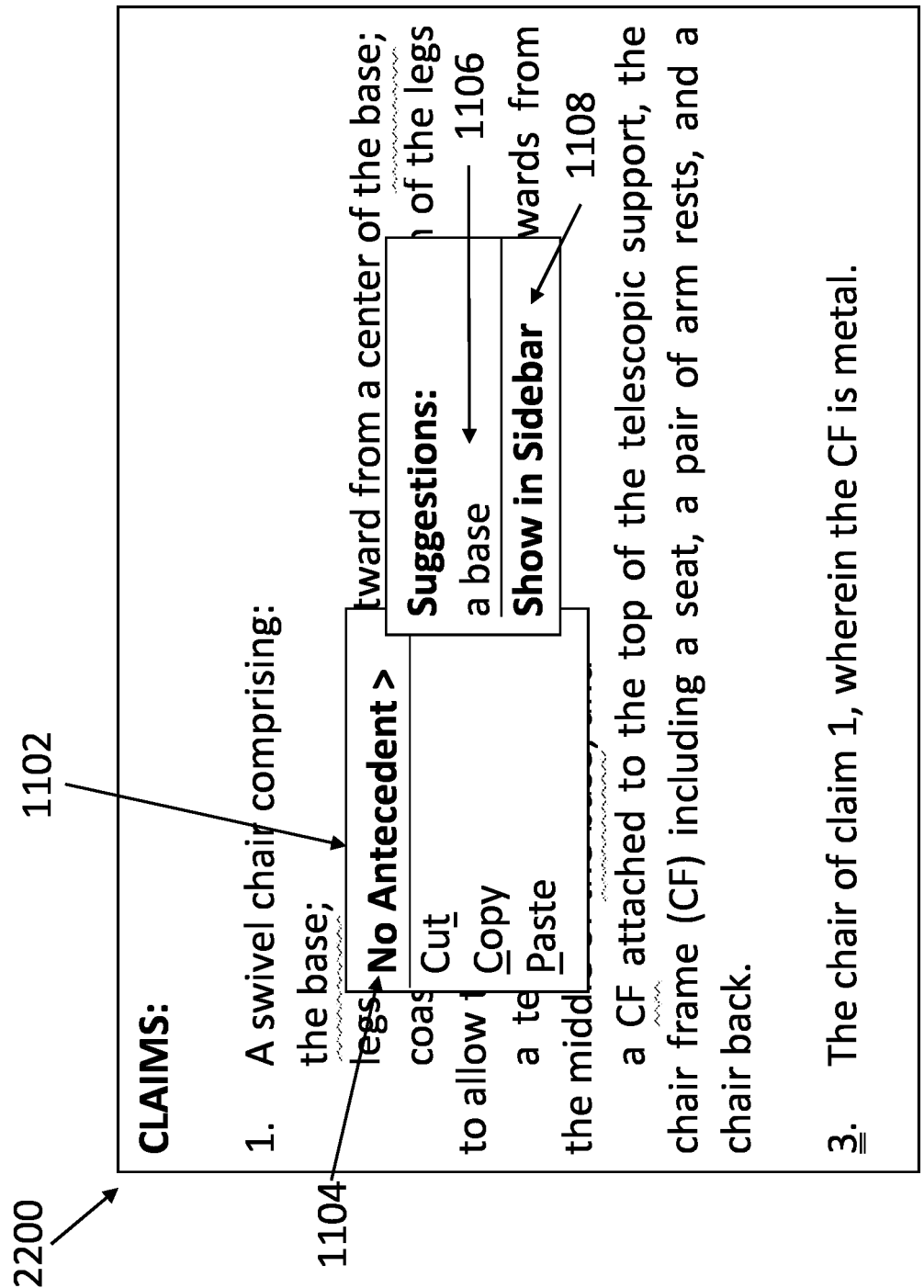
FIG. 22 illustrates an example user interface of the document including a suggestions display having suggestions for resolving a flagged claim element.

FIG. 22 illustrates an example user interface 2200 of the document 114 including a suggestions display 1102 having suggestions for resolving a flagged claim element 1502. The suggestions display 1102 may be invoked, for example as a context menu by a user right-clicking on the flagged item indicated by an indication 1002. Again, this is only one example and various other user interface actions may be used to invoke the suggestions display 1102.

The suggestions display 1102 may include a reason indication 1104 specifying why the text was flagged (here, a lack of antecedent basis). The suggestions display 1102 may further include a listing of corrections 1106 for the flagged item. In the illustrated example, the listing of corrections 1106 includes the same term introduced by an indefinite article as "a body" instead of as "the body." The user may select this choice to have the corrected text replace the flagged text of the indication 1002. The suggestions display 1102 may further include a show in sidebar 1108 item that, when selected, highlights the selected indication 1002 in the tree control 702. This may allow the user to view the instance of the selected indication 1002 in the context of other instances of the same element 1502, which may be useful in determining and confirming the corrected text.

FIG. 23 illustrates an example user interface 2300 of the document 114 including the suggestions display 1102 having suggestions for resolving the flagged acronym. Similar to the user interface 2200, in the user interface 2300 the suggestions display 1102 includes a reason indication 1104 specifying why the text was flagged (here, an undefined acronym 408), as well as a listing of corrections 1106, based on the acronym definitions 402 for the acronym located elsewhere in the document 114 and/or based on querying a listing or database of acronym definitions 402.

FIG. 24 illustrates an example user interface 2400 of a suggestions dropdown 2402 for use when drafting the claim text. The suggestions dropdown 2402 may be configured to include a listing of those claim elements 1502 that match with the text currently being typed by the user. For instance, in the user interface 2400, the user has typed "the" and is starting to type a word that begins with the letter "c." Based on that, the application 116 may identify whether any previously-introduced claim elements 1502 in the claims of the patent document 114 match the selected text. As shown, the terms "center," "swivel chair," "chair back," "coasters," and "CF" each include a word that begins with the letter "c." Thus, these words are shown in the suggestions dropdown 2402, which may be placed in the user interface 2400 near the current caret location at which the user is typing. The letter "c" is further shown in highlight in the suggestions dropdown 2402, to allow the user to understand why the choices have been included in the suggestions dropdown 2402.

It should be noted that in other examples, any word that includes the letter types in may be included. In yet a further example, the term may only be included in the suggestions dropdown 2402 if the first word of the term matches to the typed in text.

As further text is typed in, the choices may narrow or disappear. For instance, if the user types in an "a" such that the word is now "ca," then there are no matches and the suggestions dropdown 1402 may disappear. If the user types in an "o" such that the word is now "co," the choice "coasters" may be the only choice remaining in the suggestions dropdown 2402. In such a case, that element may be highlighted such that pressing tab allows for the selected item to be pasted into the document 114. If there are multiple choices in the suggestions dropdown 2402, the up and down arrow keys may be used to make a selection and tab may be used to paste that selection into the document 114. The escape key may be used to close the suggestions dropdown 2402 if none of the choices are desired. Or, the user may continue to type ignoring the suggestions dropdown 1402, as without hitting tab the suggestions dropdown 2402 takes no action with respect to the text of the document 114. It should be noted that this is only one possible approach with respect to automatic suggestions, and other approaches may be used. For instance, other keys or combinations of keys may be used to control the operation of the suggestions dropdown 2402. Or, the suggestions may be drawn inline in the document 114 in a different color or other manner to indicate the proposed suggestion. Significantly, the data used to provide the information for the suggestions dropdown 1402 may be the same data that used to populate the tree control 702 as well as to draw the indications 1002.

FIG. 25 illustrates an additional example user interface 2500 of a suggestions dropdown 2402 for use when drafting the claim text. For instance, in the user interface 2500, the user has typed "a" and is starting to type a word that begins with the letter "s." Based on that, the application 116 may identify whether any elements 202 in the description of the patent document 114 match the selected text. This may allow the user to select from elements that are discussed in the specification, but that have not yet been claimed. This is as opposed to the example shown in the user interface 2400, where the user has typed a definite article and the suggestions are instead a listing of previously introduced claim terms. In some examples, the application 116 may exclude elements 202 that are already introduced in the claim from the suggestions dropdown 2402.

Referring to the listing of elements 202 identified in the sample specification, the terms "seat," "swivel chair," and "telescopic support" each includes a word that begins with the letter "s." In the illustrated example, the terms "swivel chair" and "telescopic support" have already been introduced in the context of claim 2 (e.g., in base claim 1 from which claim 2 depends). Thus, these elements 202 are filtered out of the final list of suggestions, leaving only the term "seat" as shown. Accordingly, this word is shown in the suggestions dropdown 2402, which may be placed in the user interface 2400 near the current caret location at which the user is typing. The letter "s" is further shown in highlight in the suggestions dropdown 2402, to allow the user to understand why the choices have been included in the suggestions dropdown 2402. Since there is only a single choice, that choice is shown as highlighted in the suggestions dropdown 2402, allowing the user to select tab to have the word inserted into the claim as the current word, updating the text to read in part " . . . , wherein a seat."

Variations on the operation of the suggestions dropdown 2502 are possible. In an example, the filtering out of previously introduced claim terms may be optional. In another example, the suggestions dropdown 2502 may show both terms that are introduced as well as terms that have not been introduced (e.g., "seat," "swivel chair," etc.). In yet another example, the suggestions dropdown 2502 may show terms including articles (e.g., "a seat," "the swivel chair," etc.). In still a further example, the suggestions dropdown 2502 may provide other claim-specific suggestions to complete the typing of various common patent phrases, such as "selected from the group consisting of," "at least one of," "one or more of," "the method of claim," etc.

Figure 26:
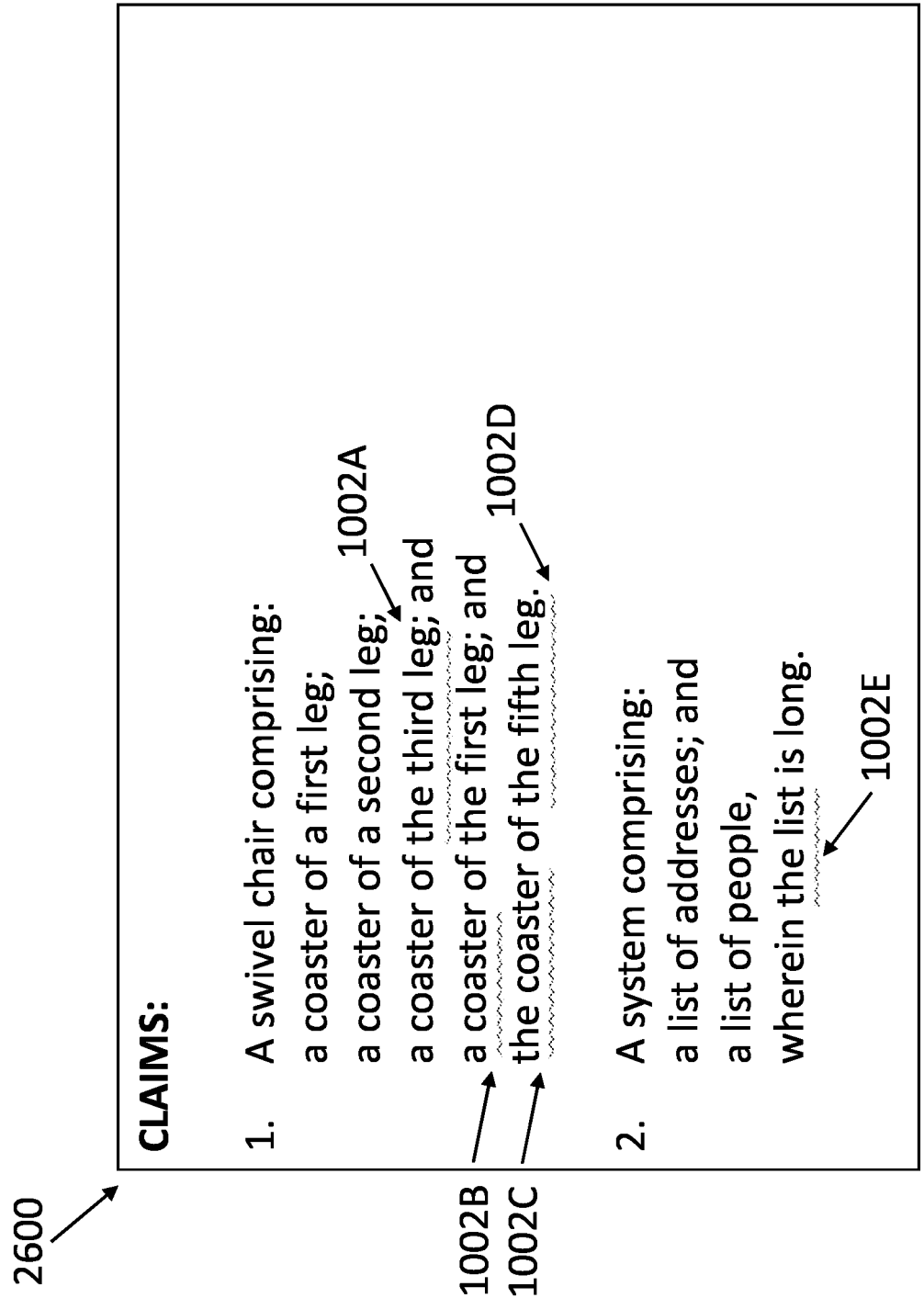
FIG. 26 illustrates an example user interface of a different document, illustrating additional aspects of the flagging of claim items.

FIG. 26 illustrates an example user interface 2600 of a different document 114, illustrating additional aspects of the flagging of claim items. For the illustrated claim 1 in FIG. 26, four errors are flagged. First, it is flagged at the indication 1002A that "the third leg" lacks antecedent basis. This can be seen as there is no "a first leg" for "the third leg" to relate back to.

Next, it is flagged at the indication 1002B that "a coaster" is a redefinition of "a coaster of a first leg." Yet, "a coaster of a second leg" is not flagged. This is because the word "of" may operate as a linker word, meaning that the terms before and after the linker word may be considered as a compound term for antecedent basis. Accordingly, the actual term to match for reintroductions is actually "a coaster of a second leg," not simply "a coaster." Similarly, this is also why "a coaster of the first leg" is flagged, because the "first leg" is already defined as having "a coaster" earlier in the claim. Additionally, "the coaster" may be flagged at the indication 1002C because there is no defined coaster of the fifth leg. Finally, "the fifth leg" may be flagged at the indication 1002D because no fifth leg was introduced.

Similarly, in the example claim 2, "the list" is flagged as being ambiguous. Here, it is not clear which list is being references, as "the list" may relate back to "a list" in the context of "a list of addresses" and also to "a list" in the context of "a list of people." Were claim 2 to have only included "a list of addresses" or "a list of people," but not both, then "the list" would not have two potential antecedents and therefore would not be flagged. In some examples, the claim terms that cause the later ambiguity may also be flagged. For instance, the term "a list of people" may additionally or alternately be flagged as producing the later ambiguity for the term "the list."

It should be noted that linker words may link more than two terms together. Similarly, "a coaster of a first leg of a first chair" and "a coaster of a first leg of a second chair" should not be flagged. If both "a coaster of a first leg of a first chair" and "a coaster of a first leg of a second chair" are in a claim, then "the coaster" or "the coaster of the first leg" would be ambiguous. If only one of "a coaster of a first leg of a first chair" or "a coaster of a first leg of a second chair" is in the claim, then "the coaster" or "the coaster of the first leg" would be unambiguous and not flagged.

It should also be noted that words other than "of" may be used as linker words between terms. For instance, the word "for" may similarly be considered a linker word. In an example, "instructions for a first operation" and "instructions for a second operation" should not be considered a reintroduction of "instructions," as the entire phase should instead be considered through the linking word as a phrase. In another example, the linker word may be a gerund such as "using", "having", "including", "storing," etc.

Figure 27:
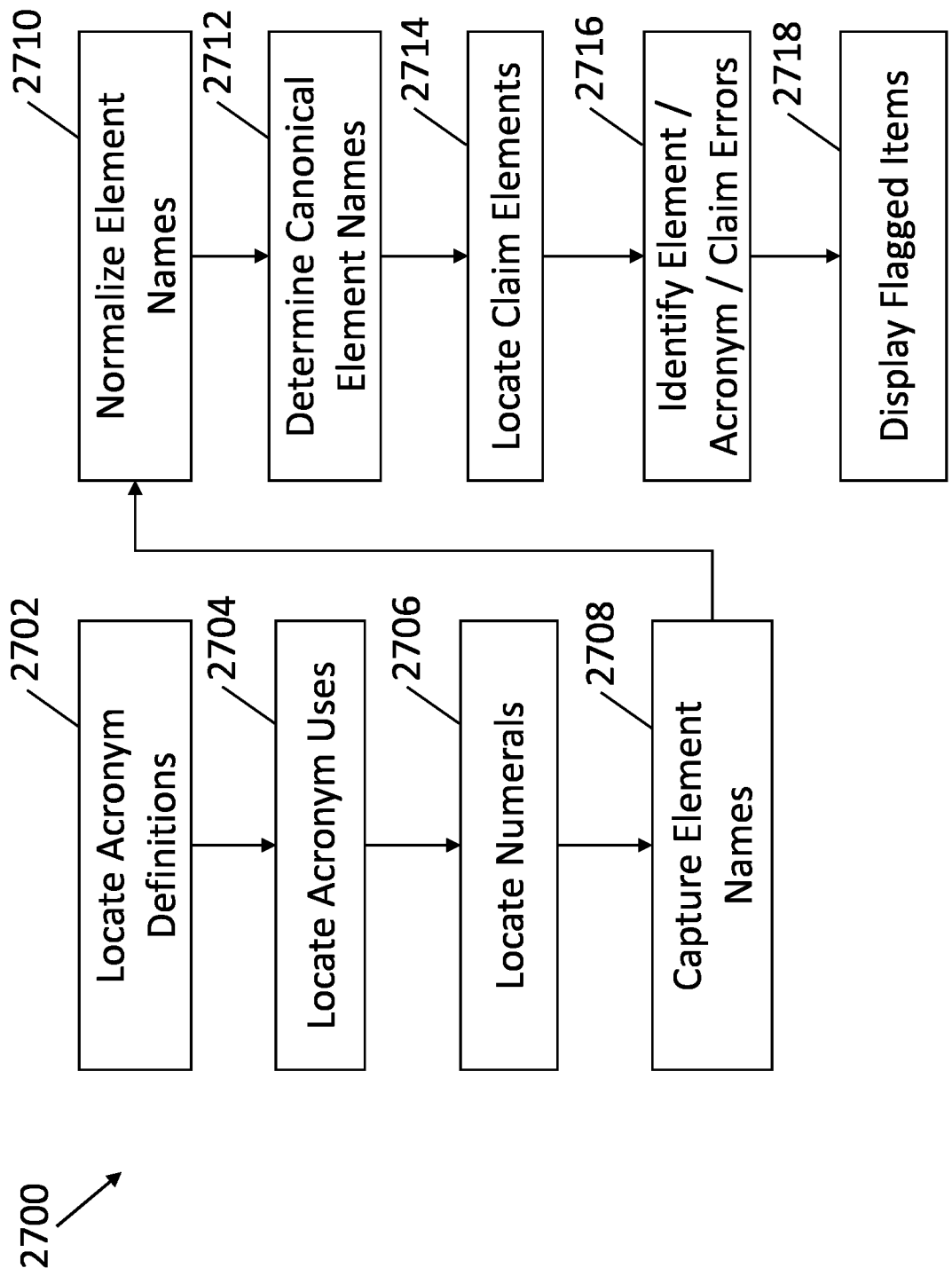
FIG. 27 illustrates an example process for use in automated patent proofreading analysis, as well as for use of such analysis in providing writing aids for the drafting of patent applications.

FIG. 27 illustrates an example process 2700 for use in automated patent proofreading analysis, as well as for use of such analysis in providing writing aids for the drafting of patent applications. In an example, the process 2700 may be performed by the applications 116 of the system 100 as executed by the processor 104 on a document 114 retrieved from the storage 106.

At operation 2702, the system 100 locates acronym definitions 402. In an example, the application 116 scans the text of the document 114 for text located within parentheticals. In some cases, the short form of the acronym is included within the parenthetical, while the long form of the acronym, is written out immediately before the parenthetical. In other cases, the long form of the acronym is included within the parenthetical, while the short form of the acronym is written out immediately before the parenthetical. These definitions may be located in the text, and stored in a data structure maps between the short forms to the long forms. The locations in the text for the definitions may also be stored in a data structure.

At operation 2704, the system 100 locates acronym uses 404. For instance, the uses of acronyms may be identified by words instances of all capitals. In another example, the uses of acronyms may be determined by searching for instances of each of the short forms located at operation 2702.

At operation 2706, the system 100 locates element 202 numerals. In an example, the elements 202 may be identified in the text by scanning the document 114 for reference numerals. This scan may be performed, for example, by using a regular expression or other textual search for numeric values.

At operation 2708, the system 100 captures element 202 names. For each located reference numeral, the text may be scanned towards the beginning of the document until the entire element name is read in. The scan may be performed using various techniques. In a simple example, the scan may be performed in a backwards direction until a stop word or punctuation is reached. In another example, natural language processing techniques such as part of speech tagging or machine-learning models may be used to determine where a noun phrase ends (or likely ends). Once located, each instance of an element 202 may be stored in a data structure. This data structure may include fields for the beginning character location in the text for the element 202, the ending character location in the text for the element 202, the value of the element numeral, the textual name for the element 202, etc.

At operation 2710, the system 100 normalizes the captured element 202 names. For instance, the names of elements 202 found at operation 2708 may be converted into normalized names by a conversion of each of the names into a singular form, into a plural form, or into a word stem representation. Additionally or alternatively, all acronym definitions 402 or expanded uses of acronyms in the element names may be converted into the shortened acronym text to form the normalized name. In the alternative, acronyms may be covered into expanded form to form the normalized name. These acronym conversions may be done using find and replace based on the short form and long form acronym data stored in the state structure. The normalized names of each element 202 may be stored in the data structure for processing.

At operation 2712, the system 100 determines canonical element 202 names. For instance, for each element 202 numeral, the application 116 may identify the most commonly used element name as being the likely correct element name. In case of a tie, the shorter name, the longer name, or the first appearing name may be used. Additionally or alternately, the first instance of the element name may be used as the likely correct element name.

At operation 2714, the system 100 locates claim elements 1502. In an example, the application 116 may identify elements 1502 by searching for noun phrases after articles. In other examples, natural language processing, part of speech tagging, machine-learning models, etc. may be used to determine where noun phrases begin or end. As with the elements 202, once located the elements 1502 may be added to a data structure for processing, the data structure including fields for the beginning character location in the text for the element 1502, the ending character location in the text for the element 1502, the textual name for the element 1502, etc.

At operation 2716, the system 100 identifies element, acronym, and/or claim errors. For instance, using the element data, the application 116 may flag any element 202 names that fail to match the canonical element name for the corresponding element numeral. In another example, using the acronym data, the application 116 may flag any instances of acronyms that are used before they are defined, never defined, or redefined. In yet a further example, using the claim data the application 116 may flag any claim elements 1502 that lack antecedent basis to earlier terms in the claim or to terms in base claims, that are reintroduction of earlier terms or terms in base claims, or that have ambiguous antecedent bases to multiple possible earlier terms or terms in base claims.

At operation 2718, the system 100 displays the located items in view of the flagged items of operation 2716. In an example, the application 116 may display, in the user interface, indications 1002 overlaid on the text of the document 114 that illustrate the locations of any flagged items. Examples of such user interfaces are discussed herein at least with respect to FIGS. 10, 21, and 26. Moreover, responsive to user selection of the indications 1002, the application 116 may display, in the user interface, the suggestions display 1102 to allow the user to understand the reason for the flagged item as well as to receive suggestions to automatically correct the flagged item. Examples of such user interfaces are discussed herein at least with respect to FIGS. 11-12 and 22-23. Additionally or alternately, the application 116 may display, in the user interface, a tree control 702 including a listing of the located items, including flag indications 710 showing which elements are flagged. Examples of such user interfaces are discussed herein at least with respect to FIGS. 7-9 and 19. Additionally or alternately, the application 116 may display, in the user interface, a suggestions dropdown 1402 to allow the user to select from identified terms that are correct and would not be flagged, allowing the user to avoid creating new flagged issues in the document 114. An example of such a user interface is discussed herein at least with respect to FIG. 14. After operation 2718, the process 2700 ends.

It should be noted that while the process 2700 is shown as being linear, in many examples operations of the process 2700 may be performed concurrently, and/or continuously in a loop to ensure that the data structure includes the most up-to-date information for the document 114 as it is being edited.

By analyzing aspects of the elements, claims, and acronyms, in a document written in a human-language such as English, issues with patent reference numerals and/or claim indefiniteness may be automatically identified in such human-language documents 114. Because such issues depend on the context of the patent application itself, these issues would not otherwise be detectable by a spell checker or grammar checker utility, as those tools instead focus on the spelling of words in isolation or in the sentence context such as for subject/verb agreement. As opposed to spelling or grammar checkers, in one non-limiting example, the same element name (e.g., "chair 102") may be correct when used in the English language context of one application but may be incorrect when used in the English language context of another application with differently numbered elements. Moreover, by analyzing the elements, claims, and acronyms as discussed herein, suggestions may be automatically provided, within the human-language context of the application, to aid the patent drafter in correcting existing issues and avoiding the creation of further issues in the document 114 text.

Variations on the disclosed concepts are possible. In an example, using the listing of elements 202, additional issues may be flagged and shown, e.g., as underlines or in the tree control 702. In an example, the first uses of each of the elements 202 in the specification may be analyzed to determine whether any elements are introduced out of numeric order. For example, if element 260 is introduced before element 250, then the first use of element 260 may be flagged. One example algorithm to determine out of order introductions is to utilize the longest common subsequence algorithm on the listing of first uses of the elements 202, as any elements 202 that are not part of the longest common subsequence are by definition introduced out of order.

A feature may also be provided to generate a parts list based on the located elements. For example, the parts list may include each of the numerals and the corresponding element text from the elements 202. The parts list may be pasted into the specification, e.g., responsive to selection of the feature.

In another example, uses of an element 202 missing the element numeral may be flagged and shown, e.g., as underlines or in the tree control 702. For instance, each of the element names may be searched for in the document 114, and any located elements names without the element numeral may be flagged, with a suggestion to add the element numeral (e.g., using the suggestions display 1102).

In yet another example, uses of an expanded acronym after the acronym definition 402 may be flagged and shown. For instance, if the expanded version of an acronym is used after the acronym definition 402, then that instance may be flagged, with a suggestion to instead use the shortened acronym version instead (e.g., using the suggestions display 1102).

In still another example, the elements 1502 of the claims may be compared with the elements 202 of the detailed description (or possibly other non-claim portions) of the document 114. If any terms are included in the elements 1502 of the claims but are not defined as elements 202, then those claim terms may be flagged, e.g., with a suggestion to define a numeral in the specification corresponding to those claim terms. If, for instance, the claim term appears in the text of the detailed description without a numeral, then that text may also be flagged, with a suggestion to define that term in the specification text (and also in the figures) with a numeral to provide support for the claim terms. The numeral may be suggested as well, such as by choosing a numeral that is unused and in the order of the numerals as introduced in the specification. For instance, if the term to number is after a first term introduced with a first number and is before a second term with a second number greater than the first number, a number may be suggested that is between the first number and the second number.

Other operations may be possible based on the comparison of the elements 1502 of the claims with the elements 202 of the detailed description. For example, for claim terms that are defined by numerals in the rest of the specification, those numerals may be added to the claims after the corresponding elements 1502 (and also to the abstract), e.g., in parentheticals that indicate the corresponding numeral. For instance, a function may be made available in the user interface to allow a user to automatically have numerals added to the abstract and claims using such an approach.

In another example, uses of element 202 numerals in the brief description of drawings may be flagged, with a suggestion to remove the numeral from the brief description of drawings. In another example, if an element 202 is introduced for the first time with a definite article, then that element 202 may be flagged, e.g., with a suggestion to introduce the term with an indefinite article (or no article if the term is plural, uncountable, etc.).

In another example, elements 1502 that are within the preamble of a claim may be identified. For instance, this may be accomplished by considering elements before a transitionary phase (e.g., "comprising", "consisting of", the first colon in the claim, the first newline in the claim, etc.) as being part of the preamble. Additionally, any claim terms that depend from a term defined in the preamble may be flagged. This may be useful, for example to flag instances where the preamble may be found to be limiting by being relied upon in the body of the claim. Or, as another possibility, terms may be allowed to be reintroduced in the body that are introjected in the preamble.

In general, the processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as read-only memory (ROM) devices and information alterably stored on writeable storage media such as floppy disks, magnetic tapes, compact discs (CDs), RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A system for document analysis, comprising:
   a memory configured to store a document and an application, the document including text of a patent specification; and
   a processor programmed to execute the application on the document to
   capture, in the document, acronym data including acronym definitions and acronym uses,
   capture, in the document, element data including element numerals and element names corresponding to the element numerals,
   normalize the element names in the element data based at least in part on the acronym definitions,
   determine canonical names for each of the element numerals,
   flag the element data for which the normalized element names fail to match the canonical names for corresponding element numerals of the element data,
   display at least a portion of the text of the patent specification of the document,
   display the flagged element data in a user interface as indications overlaid onto the text of the patent specification as underlines of the flagged element data, each of the indications corresponding to a flagged item of the element data, thereby providing illustration of the flagged items in the context of the document itself, and
   display, in the user interface, a tree control including a listing of the element data and their respective paragraph locations within the document,
   wherein each of the element numerals is presented in the tree control as an expandable section, such that each of the expandable sections includes a flag indication together with a listing of the elements having the corresponding element numeral shown in the context of the text of the application, and
   wherein each of the flagged items of the element data is shown in the tree control as being highlighted.

2. The system of claim 1, wherein the processor is further programmed to normalize the element names by one or more of converting the element names into a singular form, of converting the element names into a plural form, or of converting the element names into a stemmed form.

3. The system of claim 1, wherein the processor is further programmed to, responsive to user selection of one of the indications, display, in the user interface, a suggestions display as a context menu, the suggestions display indicating a reason that the element data corresponding to the one of the indications was flagged and one or more textual suggestions to replace the flagged item to automatically correct the flagged item.

4. The system of claim 3, wherein the processor is further programmed to, responsive to selection of one of the textual suggestions, replace text of the flagged item in the document with corrected text corresponding to the selected textual suggestion, thereby correcting the flagged item.

5. The system of claim 1, wherein the processor is further programmed to display, in the user interface, an acronym tree control including a listing of the acronym data and their respective paragraph locations within the document,
   wherein each of the acronyms is presented in the acronym tree control as an expandable section, such that each of the expandable sections includes a listing of the acronym definitions and acronym uses of corresponding acronyms, shown in the context of the text of the application.

6. The system of claim 1, wherein the processor is further programmed to display, in the user interface, a suggestions dropdown including a subset of the element data that matches with text currently being typed by a user into the text of the patent specification.

7. The system of claim 1, wherein the reason that the element data corresponding to the one of the indications was flagged is inconsistent element numeral use, and the one or more textual suggestions to replace the flagged text to automatically correct the flagged item include (i) the element numeral of the element data with the correct element name corresponding to the element numeral, and (ii) the element name of the element data with the correct element numeral corresponding to the element name.

8. A system for document analysis, comprising:
   a memory configured to store a document and an application, the document including text of one or more claims; and
   a processor programmed to execute the application on the document to
   capture, in the document, acronym data including acronym definitions and acronym uses,
   capture, in the document, claim data including claim elements recited in the one or more claims,
   normalize the claim elements in the claim data based at least in part on the acronym definitions,
   identify antecedent basis issues for the claim elements,
   flag the claim data for which the claim elements fail to find antecedent basis in the claim elements, and
   display at least a portion of the text of the one or more claims of the document,
   display the flagged claim data in the user interface as indications overlaid onto the text of the patent claims as underlines of the flagged claim data, each of the indications corresponding to a flagged item of the claim data, thereby providing illustration of the flagged items in the context of the document itself,
   display, in the user interface, a tree control including a listing of the claim data,
   wherein each of the claims is presented in the tree control as an expandable section, such that each of the expandable sections includes a flag indication together with a listing of the claim elements, shown in order of appearance in the one or more claims, and
   wherein each of the flagged items of the claim data is shown in the tree control as being highlighted.

9. The system of claim 8, wherein the processor is further programmed to, responsive to user selection of one of the indications, display, in the user interface, a suggestions display as a context menu, the suggestions display indicating a reason that the claim data corresponding to the one of the indications was flagged and one or more textual suggestions to automatically correct the flagged item.

10. The system of claim 9, wherein the processor is further programmed to, responsive to selection of one of the textual suggestions, replace text of the flagged item in the document with corrected text corresponding to the suggestion, thereby correcting the flagged item.

11. The system of claim 8, wherein the processor is further programmed to display, in the user interface, a suggestions dropdown including a subset of the claim data that matches with text currently being typed by a user into the application.

12. The system of claim 8, wherein the processor is further programmed to:
capture, in the document, element data including element numerals and element names corresponding to the element numerals;
normalize the element names in the element data based at least in part on the acronym definitions;
determine canonical names for each of the element numerals;
display, in the user interface, responsive to identifying entry into the document of an indefinite article and at least a portion of a following term, a suggestions dropdown including a subset of the element data that matches with the term currently being typed into the application, while excluding elements of the element data already introduced in the claim data; and
display, in the user interface, responsive to identifying entry into the document of a definite article and at least a portion of the following term, the suggestions dropdown including a subset of the claim data that matches with the term currently being typed into the application already introduced in the claim data.

13. A method for document analysis, comprising:
capturing, in a document including text of a patent specification and one or more claims, acronym data including acronym definitions and acronym uses;
capturing, in the document, element data including element numerals and element names corresponding to the element numerals;
normalizing the element names in the element data based at least in part on the acronym definitions;
determining canonical names for each of the element numerals;
flagging the element data for which the normalized element names fail to match the canonical names for corresponding element numerals of the element data;
capturing, in the document, claim data including claim elements recited in one or more claims;
normalizing the claim elements in the claim data based at least in part on the acronym definitions;
identifying antecedent basis issues for the claim elements;
flagging the claim data for which the claim elements fail to find antecedent basis in the claim elements; and
displaying at least a portion of the text of the document in a user interface;
displaying the flagged claim data and the flagged element data in the user interface, thereby providing illustration of the flagged items in the context of the document itself, including one or more of:
displaying in the user interface, indications overlaid as underlines of the flagged element data, each of the indications corresponding to a flagged item of the element data, and displaying, in the user interface, an element tree control including a listing of the element data and their respective paragraph locations within the document, wherein each of the element numerals is presented in the element tree control as an expandable section, such that each of the expandable sections includes a flag indication together with a listing of the elements having the corresponding element numeral shown in the context of the text of the application, and wherein each of the flagged items of the element data is shown in the element tree control as being highlighted, and/or
displaying, in the user interface, indications overlaid as underlines of the flagged claim data, each of the indications corresponding to a flagged item of the claim data, and displaying, in the user interface, a claim tree control including a listing of the claim data, wherein each of the claims is presented in the claim tree control as an expandable section, such that each of the expandable sections includes a flag indication together with a listing of the claim elements, shown in order of appearance in the one or more claims, and wherein each of the flagged items of the claim data is shown in the claim tree control as being highlighted.

14. The method of claim 13, further comprising normalizing the element names by one or more of converting the element names into a singular form, of converting the element names into a plural form, or of converting the element names into a stemmed form.

15. The method of claim 13, further comprising, responsive to user selection of one of the indications, displaying, in the user interface as a context menu, a suggestions display indicating one or more of a reason that the element data corresponding to the one of the indications was flagged or a suggestion to automatically correct the flagged item.

16. The method of claim 15, further comprising, responsive to selection of the suggestion, replacing text of the flagged item in the document with corrected text corresponding to the suggestion, thereby correcting the flagged item.

17. The method of claim 13, further comprising displaying, in the user interface, a tree control including a listing of the acronym data.

18. The method of claim 13, further comprising displaying, in the user interface, a tree control including a listing of the element data.

19. The method of claim 13, further comprising displaying, in the user interface, a suggestions dropdown including a subset of the element data that matches with text currently being typed by a user into an application displaying the document.

20. The method of claim 13, further comprising displaying, in the user interface, a tree control including a listing of the claim data.

21. A non-transitory medium comprising instructions for document analysis that, when executed by a processor cause the processor to perform operations including to:
capture, in a document including text of a patent specification, acronym data including acronym definitions and acronym uses;
capture, in the document, element data including element numerals and element names corresponding to the element numerals;
normalize the element names in the element data based at least in part on the acronym definitions;
determine canonical names for each of the element numerals;

flag the element data for which the normalized element names fail to match the canonical names for corresponding element numerals of the element data;

display at least a portion of the text of the patent specification of the document in a user interface;

display the flagged element data in the user interface, including to display indications overlaid onto the text as underlines of the flagged element data, each of the indications corresponding to a flagged item of the element data, thereby providing illustration of the flagged items in the context of the document itself;

display, in the user interface, a tree control including a listing of the element data and their respective paragraph locations within the document, wherein each of the element numerals is presented in the tree control as an expandable section, such that each of the expandable sections includes a flag indication together with a listing of the elements having the corresponding element numeral shown in the context of the text of the application, and wherein each of the flagged items of the element data is shown in the tree control as being highlighted;

responsive to user selection of one of the indications, display, in the user interface, a suggestions display as a context menu overlaying the text, the suggestions display indicating a reason that the element data corresponding to the one of the indications was flagged and one or more textual suggestions to replace the flagged text to automatically correct the flagged item; and responsive to selection of one of the textual suggestions from the context menu, replace the flagged item in the document with the selected one of the textual suggestions, thereby correcting the flagged item.

\* \* \* \* \*